(12) United States Patent
Jia

(10) Patent No.: US 8,527,739 B2
(45) Date of Patent: Sep. 3, 2013

(54) ITERATIVE PROCESS PARTNER PAIRING SCHEME FOR GLOBAL REDUCE OPERATION

(75) Inventor: Bin Jia, North Bergen, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/269,619

(22) Filed: Oct. 9, 2011

(65) Prior Publication Data

US 2012/0066692 A1 Mar. 15, 2012

Related U.S. Application Data

(62) Division of application No. 11/611,477, filed on Dec. 15, 2006, now Pat. No. 8,065,503.

(51) Int. Cl.
*G06F 9/46* (2006.01)

(52) U.S. Cl.
USPC .............................. 712/30; 719/313

(58) Field of Classification Search
None
See application file for complete search history.

(56) References Cited

U.S. PATENT DOCUMENTS

| | | | |
|---|---|---|---|
| 5,887,186 A | 3/1999 | Nakanishi | 712/28 |
| 5,963,731 A | 10/1999 | Sagawa et al. | 395/500.27 |
| 7,555,509 B2 | 6/2009 | Yamamoto et al. | 708/401 |
| 7,587,453 B2 * | 9/2009 | Bhrara et al. | 709/204 |
| 8,041,946 B2 * | 10/2011 | Bunn et al. | 713/166 |
| 2005/0149367 A1 * | 7/2005 | Lee et al. | 705/7 |

OTHER PUBLICATIONS

Rolf Rabenseifner, Optimization of Collective Reduction Operations, International Conference on Computational Science 2004, Lecture Notes in Computer Science (LNCS), vol. 3036/2004, pp. 1-9.

* cited by examiner

*Primary Examiner* — Kenneth Kim
(74) *Attorney, Agent, or Firm* — Ido Tuchman; Libby Z. Toub

(57) ABSTRACT

Distributing a computing operation among processes and for gathering results of the computing operation from the plurality of processes. An exemplary method includes the operations of pairing a plurality of processes such that each process has a maximum of one interaction partner, selecting half of the data located at a process, dividing the selected half of the data into a plurality of data segments, transmitting a first data segment resulting from the dividing operation from the process to the interaction partner of the process, receiving a second data segment at the process from the interaction partner, concurrently with the transferring and receiving operations, performing a computing operation on a third data segment previously received from a previous interaction partner and a fourth data segment from the data segments, and iterating over the transmitting, receiving and computing operations until all the data segments have been exchanged.

11 Claims, 10 Drawing Sheets

ITERATIVE PROCESS PARTNER PAIRING SCHEME FOR GLOBAL REDUCE OPERATION

CROSS-REFERENCE TO RELATED APPLICATIONS

This application is a divisional application and claims priority under 35 U.S.C. §120 to U.S. application Ser. No. 11/611,477 filed Dec. 15, 2006, the entire text of which is specifically incorporated by reference herein.

FIELD OF THE INVENTION

The present invention relates generally to parallel computing. More specifically, the present invention relates to techniques for distributing a computing operation among a plurality of processes and for gathering the results of the computing operation from the plurality of processes.

BACKGROUND

Parallel computing is the distribution of a computing operation among a plurality of processors and/or a plurality of computing systems. Parallel computing is advantageous because a computationally expensive processing task may take less time to complete if more processors are used. For example, scientific and technological research frequently comprises computational tasks which, due to their complexity, require years to complete on a single processor. However, such tasks can frequently be completed in a manageable amount of time if divided among a large number of processors. Weather forecasting and computerized simulations of real-world phenomena also frequently comprise complex computational tasks which may benefit from parallel computing. Parallel computing is particularly advantageous for high performance computing, a term used in the art to denote computing tasks requiring very large amounts of computational resources.

Historically, computationally expensive computing tasks have been executed by supercomputers, specialized systems having very fast processors. However, a parallel computing system may solve such tasks in a more cost-effective manner than a supercomputer. A primary reason is because adding additional processors through parallel computing may improve performance more effectively and/or at a lower cost than increasing computing power by increasing the speed of an individual processor. This is because there are diminishing returns to increasing the speed and performance of a single processor. By contrast, there is often virtually no limit to the number of processors which may contribute to a computing task. The overhead required to couple together multiple processors is a far less significant factor than the diminishing returns of increasing the speed of a single processor. Moreover, parallel computing may beneficially reduce the power consumption required to complete a computing task. This is because performance derived from parallel execution is generally more power efficient than performance derived from increased processing speed.

One of the operations in parallel computing is the global reduce operation. In a global reduce operation, a plurality of processes collaborate to complete a computing operation. The processes are located at different processors and/or different computing systems. Each process initially has a quantity of data known in the art as an input vector. The global reduce operation combines all the input vectors using a specified computing operation or set of computing operations. When the vectors are large, this may be achieved by each processor performing the computing operations or set of computing operations on a subset of the vector. It is emphasized that a wide variety of computing operations known in the art may be applied in conjunction with global reduce. The performance of the global reduce operation is essential to many high performance parallel applications.

For parallel computing to succeed, it is important for the processes sharing responsibility for a computing task to interact effectively with each other. It is highly advantageous for the computing task to be divided among the participating processes in predefined ways. To achieve this goal, the processes should ideally communicate with each other according to predefined communication protocols. The Message Passing Interface, or MPI, is a protocol known in the art for facilitating communication between a plurality of processors cooperating on a computing task. MPI defines semantics of various types of communications.

To facilitate communication, MPI defines a plurality of primitives. Some MPI primitives perform point-to-point communication. Among these primitives are a one-way sending operation and a one-way receiving operation. Other MPI primitives facilitate collective communication. These primitives include MPI_BARRIER and MPI_BCAST. A subset of the collective communication primitives are noteworthy because they distribute a computing operation across multiple processes. Specifically, the primitives combine both communication and computing within the same operation. This subset comprises the primitives MPI_REDUCE and MPI_ALLREDUCE, both of which perform a global reduce operation.

In an MPI_REDUCE operation, each process has an input vector. The output of the MPI_REDUCE operation is the result of applying the global combining or reducing operation on all the input vectors. Certain core computing operations, including summation and determining a minimum or maximum value, are defined by MPI. Additionally, customized computing operations not envisioned by MPI may be implemented. When the reduction is complete, the result of the reduce operation is available at a single process, known as the root. It is possible to specify which process shall serve as the root.

The input and output of an MPI_ALLREDUCE operation is similar to a MPI_REDICE operation. However, at the conclusion of an MPI_ALLREDUCE operation, the combined result of the reduce operation across all processors is available at each processor.

The performance of the MPI_REDUCE and MPI_ALLREDUCE primitives are important for the performance of parallel computing applications based on the MPI. One long term profiling determined that for parallel computing applications using the Message Processing Interface, the amount of time spent within MPI_REDUCE and MPI_ALLREDUCE accounted for more than 40% of the total time spent by the profiled applications in any MPI function. See Rolf Rabenseifner, *Optimization of Collective Reduction Operations*, International Conference on Computational Science 2004, Lecture Notes in Computer Science (LNCS), Volume, 3036/2004, Springer.

The computational cost of MPI_REDUCE or MPI_ALLREDUCE is at least $(N-1)L\gamma$, where N is the number of processes, L is the length of the vector in bytes and $\gamma$ is the reduce operation cost per byte. If distributed evenly across the processes, the computational cost at any particular process is at least $$\frac{(N-1)}{N}L\gamma.$$

The interconnection means of computing systems may include Remote Direct Memory Access (RDMA) capability. RDMA is a method by which data in memory belonging to one computer system can be transmitted to memory belonging to another computer system concurrently with processors of both systems performing distinct operations and without interfering with those operations. Techniques exist in the prior art for using RDMA to improve the performance of MPI_REDUCE and MPI_ALLREDUCE for large messages. Specifically, the overlapping of processing with data transfer provided by RDMA can be combined with the pipelining provided by MPI_REDUCE and MPI_ALLREDUCE. This prior art technique will be referred to herein as the Pipelined RDMA Tree (PRT) algorithm.

For MPI_REDUCE, the PRT algorithm splits each input vector into q slices and pipelines the handling of those slices. Communications are organized along edges connecting nodes of a process tree. Nodes of the tree represent the participating processes, and the root of the tree is the root of the MPI_REDUCE operation. Each process requires q steps of communication and computation. At step i, a process first waits for all of its child processes to deliver slice i of their vectors via RDMA. The parent process then combines the received slices with slice i of its own input vector. The reduce operation performed on slice i at the process is overlapped with the receiving of slice (i+1) from its child processes. This is possible because the reduce operation is performed by the processor while data transfer is handled by an RDMA adapter. Finally, the parent process sends the combining result to its parent. Here again, the sending of slice i can be overlapped with the reduce operation on slice (i+1).

While the PRT algorithm offers improved performance compared to non-RDMA implementations of the MPI_REDUCE and MPI_ALLREDUCE primitives, it is nonetheless suboptimal. For example, consider that either the computational cost to reduce a single byte is greater than or equal to the communication cost to transmit a single byte, or the computational cost to reduce a single byte is less than the communication cost to transmit a single byte. This follows directly from the mathematical truism that for two defined numbers, the first number must be either greater than, equal to or less than the second number.

If the reduction cost is greater than or equal to the communication cost, most of the communication cost is overlapped by computation. In this case, the computational cost of the PRT algorithm when implemented using binary trees is approximately $$\left(2 + 2\frac{\log(N)-1}{q}\right)L\gamma.$$

This is more than double the lower bound of the distributed computational cost inherently required by MPI_REDUCE and MPI_ALLREDUCE. Implementing the PRT algorithm with other process tree structures would result in an even higher cost.

If instead the reduction cost is less than the communication cost, the communication cost then becomes the predominant factor in the total cost required to apply the PRT algorithm. The communication cost can be approximated by $$\left(1 + \frac{\log(N)-1}{q}\right)L\beta,$$

where $\beta$ is the communication cost to transmit a single byte. The total amount of data communicated by each process which is neither a leaf note nor a root node is 3L. This is because each such process receives a vector L bytes in length from each of two child processes and sends a vector L bytes in length to its parent process. Although RDMA removes the serialization bottleneck at the processor and memory for transferring this data, the adapter bandwidth requirement is significantly increased. This disadvantage is especially pronounced when implementing the MPI_ALLREDUCE primitive, because each process which is neither a leaf nor the root must transfer 6L bytes of data.

SUMMARY

The present invention addresses the above-mentioned limitations of the prior art by introducing improved methods for distributing a computing operation among a plurality of processes and for gathering results of the computing operation from the plurality of processes. These improved methods require less processing time and less bandwidth compared to parallel computing methods known in the art. The improved methods may be applied to implement the MPI_REDUCE and MPI_ALLREDUCE primitives of the Message Passing Interface.

One exemplary embodiment of the invention is a method for distributing a computing operation among a plurality of processes. The method includes pairing the plurality of processes such that each process has at least one interaction partner. A selecting operation selects a subset of the data located at a process. The subset of the data may include half of the data. A dividing operation divides the selected subset of the data into a plurality of data segments. A first data segment resulting from the dividing operation is transmitted from the process to the interaction partner of the process. A second data segment is received at the process from the interaction partner. Concurrently with the transferring and receiving operations, a computing operation is performed on a third data segment previously received from a previous interaction partner and a fourth data segment from the plurality of data segments. The transmitting, receiving and computing operations are iterated until all the data segments have been exchanged.

Another exemplary aspect of the invention is a method for gathering results of a computing operation distributed among a plurality of processes. The method includes a pairing operation for pairing the plurality of processes such that each process has at least one interaction partner. A transmitting operation transmits a result of one or more computing operations from a process to the interaction partner of the process. An iterating operation iterates over the pairing and transmitting operations zero or more times. The pairing operations subsequent to the first pairing operation associate a process with an interaction partner with which the process has not previously been paired.

A further exemplary aspect of the invention is a computer apparatus for distributing a computing operation among a plurality of processes. The computer apparatus includes a memory unit for storing data and a processing unit. The processing unit is configured to perform the operations of pairing the plurality of processes such that each process has at least one interaction partner, selecting a subset of data located at a process, and dividing the selected subset of the data into a plurality of data segments. The subset of the data may include half of the data. A memory accessing unit is configured to transmit a first data segment resulting from the dividing operation from the process to the interaction partner of the process and to receive a second data segment at the process from the interaction partner. Concurrently with the transferring and receiving operations, the processing unit is configured to perform a computing operation on a third data segment previously received from a previous interaction partner and a fourth data segment from the plurality of data segments.

Yet another exemplary aspect of the invention is a computer program product embodied in computer readable medium for gathering results of a computing operation distributed among a plurality of processes. The computer program product includes program code for pairing the plurality of processes such that each process has a maximum of one interaction partner, program code for transmitting a result of one or more computing operations from a process to the interaction partner of the process, and program code for iterating over the pairing and transmitting operations zero or more times. The pairing operations subsequent to the first pairing operation associate a process with an interaction partner with which the process has not previously been paired.

The foregoing and other features, utilities and advantages of the invention will be apparent from the following more particular description of various embodiments of the invention as illustrated in the accompanying drawings.

DETAILED DESCRIPTION

Figure 1:
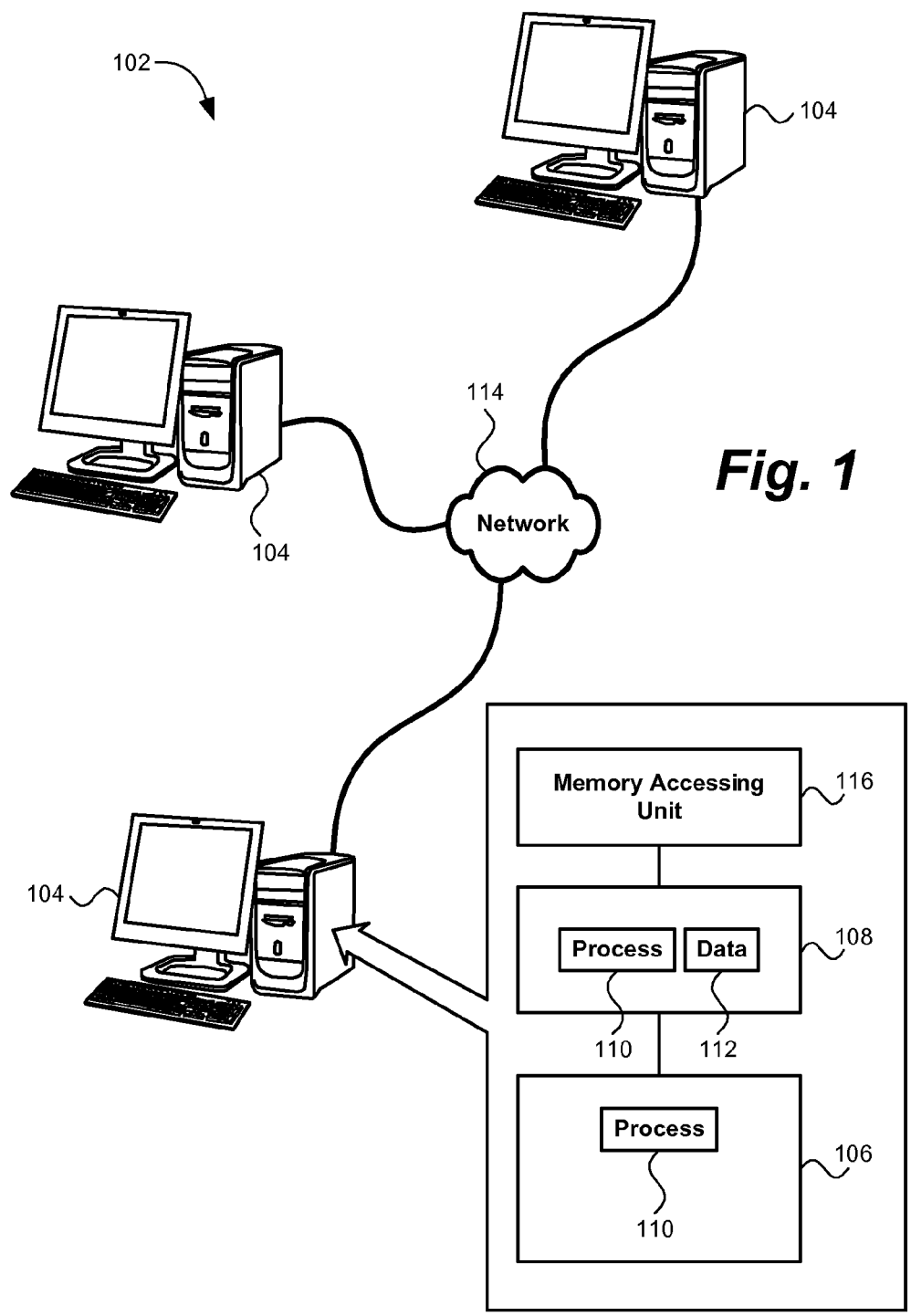
FIG. 1 shows an exemplary system for performing parallel computing as contemplated by the present invention.

The following description details how the present invention is employed to distribute a computing operation among a plurality of processes and to gather results of the computing operation from the plurality of processes. Throughout the description of the invention reference is made to FIGS. 1-9.

When referring to the figures, like structures and elements shown throughout are indicated with like reference numerals.

FIG. 1 shows an exemplary system 102 for performing parallel computing as contemplated by the present invention. The system includes one or more computing systems 104. It is contemplated that each computing system 104 is a general purpose computer. However, a computing system 104 may comprise specialized electronic devices configured to perform a predetermined computing operation. The computing systems 104 may be based on a wide variety of architectures. The computing systems 104 may execute any of a wide variety of operating systems known in the art, including without limitation z/OS®, AIX®, Linux® and Windows®. z/OS and AIX are registered trademarks of International Business Machines Corporation, Armonk, N.Y., United States. Linux® is the registered trademark of Linus Torvalds in the U.S. and other countries. Windows is a registered trademark of Microsoft Corporation, Redmond, Wash., United States. Each computing system 104 may be connected to a variety of peripheral devices, including without limitation a keyboard, a mouse, a display and one or more disk drives. It is noted that the computing systems 104 may be heterogeneous. Specifically, they may differ from each other in architecture, operating system or other important respects. According to parallel computing terminology used in the art, a computing system 104 may be referred to as a node.

Each computing system 104 includes one or more processors 106. A processor may be any of a wide variety of technological devices known in the art for performing computing operations. It is contemplated that each processor 106 is an integrated circuit. In an embodiment of the present invention, each processor is a general purpose microprocessor configured to execute arbitrary software instructions. In another embodiment of the present invention, each processor is a specialized integrated circuit configured to perform a predefined computing operation. Each processor 106 may be coupled with one or more banks of random access memory 108.

The processor 106 may execute one or more computing processes 110. The computing processes may be implemented in software, hardware or a combination thereof. For example, a computing process 110 may comprise software instructions which are tightly coupled to a specialized integrated circuit configured specifically to perform a predefined computing operation.

In an embodiment of the present invention, a computing process 110 comprises instructions stored at the random access memory 108 coupled to the processor 106. These instructions are loaded into and executed at the processor 106. A computing process 110 may additionally manipulate data 112 located at the random access memory 108. A computing process may implement the method of the present invention on a particular processor. Such a process may comprise a predefined computing operation. A computing process may also implement auxiliary functionality required to support the method of the present invention. For example, critical operating system tasks such as process swapping, memory allocation and disk access may be implemented via computing processes which implement operating system functionality. Additionally, the processor 106 may execute computing processes not related to the present invention. For example, the computing system 104 may execute a word processing system comprising one or more computing processes 110. Because word processing systems known in the art spend most of their time waiting for user input, most of the computing power of the processor 106 is available to a concurrently executing computing process 110 implementing the present invention.

A computing process 110 implementing the present invention may be associated with a number. In a particular embodiment, no two computing processes 110 within the system 102 are assigned the same number. It is noted that many operating systems known in the art assign unique numbers to each computing process 110 executing within a given computing system 104. The numbers assigned to each computing process by the present invention need not be derived from numbers assigned by the operating system.

The computing systems 104 may be connected to a network 114. The network 114 may allow any computing system 104 to communicate with any other computing system. The network may be any of various types known in the art, including by example and without limitation TCP/IP, Wi-Fi®, Bluetooth® piconets, token ring and microwave. Wi-Fi is a registered trademark of the Wireless Ethernet Compatibility Alliance, Inc., Austin, Tex., United States. Bluetooth is a registered trademark of Bluetooth SIG, Inc., Bellevue, Wash., United States. The network 114 may tightly couple the computing systems 104 to each other. The network may include various hardware devices, such as a switch (not shown). It is noted that a network 114 used in parallel computing systems is sometimes referred to as a communication fabric.

To facilitate connecting to the network 114, each computing system 104 may be coupled to a memory accessing unit 116. The memory accessing unit 116 may transmit data from the computer to the network 114 and may receive data intended for the computer from the network. It is emphasized that the transmission operation and the receiving operation are non-blocking. Non-blocking herein means that the act of transmitting the data does not interfere with the operation of either the sending or receiving processor 106.

To achieve this goal, the network adapter may implement Remote Direct Memory Access, or RDMA. Via RDMA, a memory accessing unit 116 may transmit data located at the random access memory 108 used by a computing process 110 executing on a particular processor 106 directly into the random access memory used by another process executing at a different computing system 104 than the original process. The memory accessing unit 116 may then notify the remote processor 106 owning the random access memory that the transmission is complete. Conversely, a memory accessing unit 116 may facilitate receiving data from a computing process 110 executing at a remote processor 106 and may write the received data directly into the random access memory 108 used by a computing process 110 located at the local computing system 104. It is emphasized that RDMA transmits and receives data in a non-blocking manner. However, it is noted that the present invention does not require the use of RDMA. Instead, any method allowing a computing process 110 to transmit data to any other computing process in a non-blocking manner may be used.

When a computing system 104 contains a plurality of processors 106, each processor 106 may separately execute computing processes 110 implementing the method of the present invention. Exchanging data between such computing processes 110 located at the same computing system 104 may not require Remote Direct Memory Access because the processors are not remote. Instead, information may be transmitted between the processors 106 via simpler techniques. One such technique is Direct Memory Access, a method known in the art for directly accessing random access memory from a component located at the same computing system as the random access memory. Another such technique is shared memory, a method where a bank of random access memory is accessible to any of a plurality of processors 106. In the case where all the processors 106 implementing the present invention are located at a single computing system 104, the system may not comprise a network 114. In this case, the methods previously discussed may be used instead of RDMA for exchanging data between processors 106.

Figure 2:
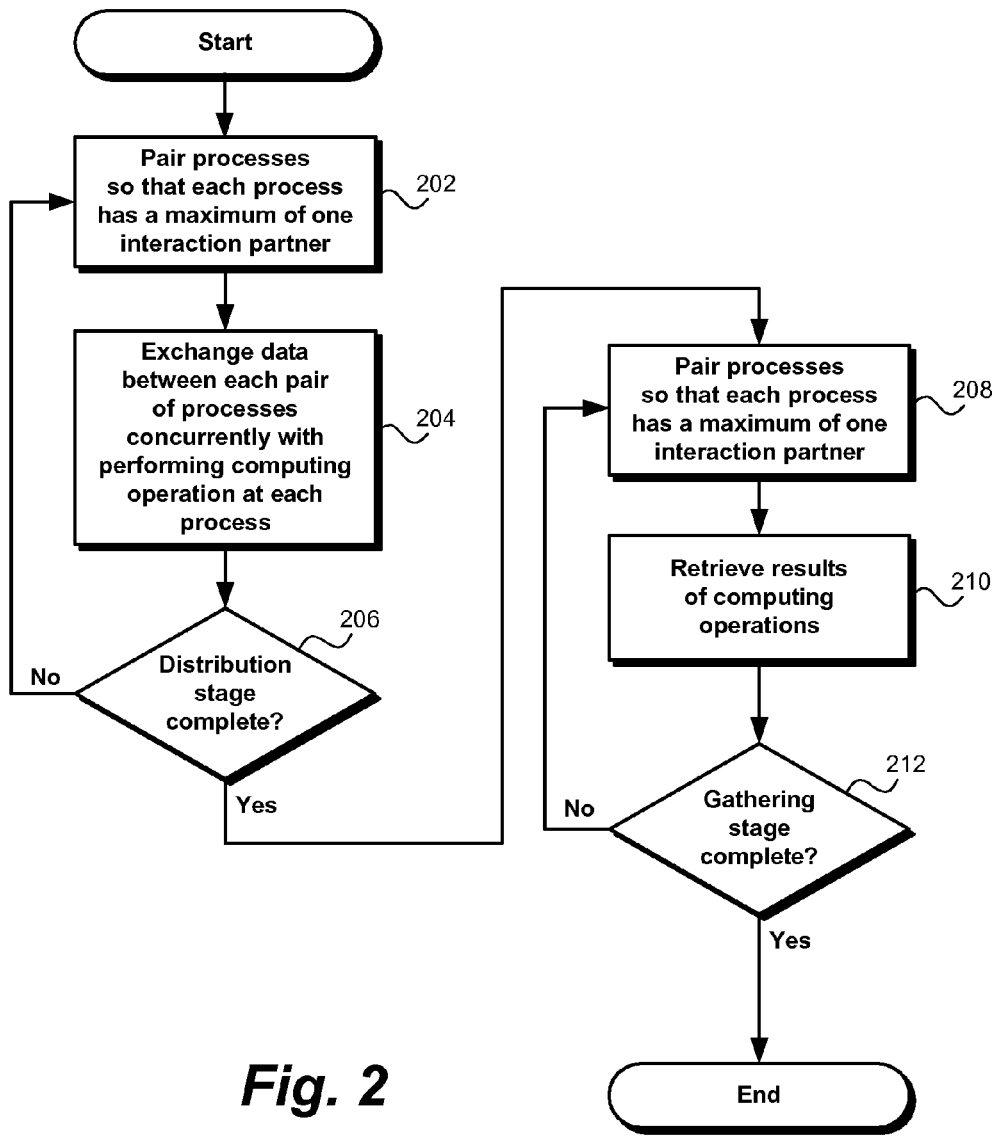
FIG. 2 illustrates a flowchart of exemplary operations to perform a global combining or reducing operation among a plurality of processes.

Turning now to FIG. 2, a flowchart of exemplary steps to perform a global combining or reducing operation is shown. The global combining or reducing operation may distribute a computing operation among a plurality of processes. The computing operation may be any of a wide variety of computing operations known in the art. The computing operation may be relatively simple, such as the summation of a series of input values. The computing operation may also be highly complex. The computing operation may be performed in furtherance of a wide variety of goals. Such goals may include without limitation scientific and technical research, predicting future weather conditions and simulating an observable event. The computing operation may be performed as part of a high performance computing task.

The plurality of processes operate in parallel to complete the global combining or reducing operation. The processes may belong to a distributed computing system such as the exemplary system demonstrated in FIG. 1. However, it is emphasized that a wide variety of systems are suited to performing the method of the present invention.

The global combining or reducing operation operates on input data known in the art as a vector. A wide variety of data may be input as the vector. The data may comprise scientific or technical data. For example and without limitation, the data may consist of inputs to a computing operation configured to predict future weather conditions. The data may also consist of inputs to a computing operation configured to simulate scientific phenomena or an observable event. A vector may comprise a large quantity of data (kilobytes or megabytes of data).

The data may be of any of a wide variety of data types. Possible data types may include, without limitation, integers, floating point numbers, character strings and arrays of other data types. The data type may also be a data structure comprising a plurality of typed subfields. A vector may have a highly complex data type. In an embodiment of the present invention, the data may be of any data type defined by the Message Passing Interface, including derived data types based on core MPI data types. For a particular global combining or reducing operation, the vector may be required to match a specified data type.

Each process is initially provided with distinct input data. This may be achieved by segmenting a single vector input to the global combining or reducing operation. It is noted that if such a vector represents data that are not contiguous, it may first be necessary to compress the data so that the vector is contiguous. The single vector may be divided among the processes contributing to the global combining or reducing operation so that each process is provided with a single subset of the vector, wherein the subsets are disjoint. In other words, each datum within the vector is included in exactly one subset. It follows that each datum is located at exactly one process.

It is contemplated that each process begins with the same quantity of input data. It is noted that this is not a requirement; it may not always be feasible for the input data to be of precisely equal length. In particular, if the total length of the data is not evenly divisible by the number of processes, it is theoretically impossible to divide the vector so that each subset is of exactly the same length. The exemplary algorithm demonstrated herein can be modified by one skilled in the art to allow the data at each process to be of unequal length.

The global combining or reducing operation can be subdivided into two stages: a distribution stage and a gathering stage. In the distribution stage, the vector is distributed among the processes engaged in the global combining or reducing operation. Each process within the system performs a computing operation on a subset of the vector. It is emphasized that the computing operation may be any of a wide variety of computing tasks known in the art. The computing operation may be a relatively simple operation such as a regular mathematical summation of the data in the vector. The computing operation may also be a highly complex operation such as predicting future weather conditions or simulating an observable event. It is noted that the computing operation may comprise other computing operations. The computing operation is performed upon a subset of the vector concurrently with the distribution of another subset of the vector, wherein the two subsets are disjoint. This pipelining technique beneficially reduces the time required to complete the global reduce operation.

In the gathering stage, results of the computing operations performed at each process are retrieved. In an embodiment of the present invention, results are transmitted in one direction until the entire result is received at a single process. The MPI_REDUCE operation as defined in the Message Passing Interface may be implemented using this embodiment. In another embodiment of the present invention, results are transmitted in both directions until the entire result is received at each process. The MPI_ALLREDUCE operation as defined in the Message Passing Interface may be implemented using this embodiment.

The distribution stage begins with pairing operation 202. At pairing operation 202, the plurality of processes are paired. Pairing operation 202 may be performed so that each process has a maximum of one interaction partner. It is contemplated that the number of processes contributing to the global reduce operation is a power of two. Under the preceding two assumptions, each process will generally have exactly one interaction partner. While the exemplary algorithm assumes that the number of processes is a power of two for demonstration purposes, the algorithm may be readily modified by one skilled in the art to facilitate numbers of processes which are not powers of two.

At exchanging operation 204, data are exchanged between each pair of processes. Each process transmits a subset of the data located thereat to its interaction partner. The subset of the data may include half of the data. Because the interaction partners themselves are processes, it follows that the interaction partner of each process likewise transmits a subset of its data. Each process may accordingly receive the data transmitted by its interaction partner. Remote Direct Memory Access may be used to transmit and receive the data in a non-blocking manner. It is noted that if the number of processes is not a power of two, a particular process may not have been paired by pairing operation 202. In this case, the unpaired process may omit participating in exchanging operation 204.

Before being transmitted, the data are divided into a plurality of segments. Accordingly, each process transmits a segment resulting from the segmenting operation to its interaction partner. Concurrently, each process receives a segment from its interaction partner which resulted from the dividing operation at the interaction partner. This process is repeated until all segments are exchanged. Segmenting the data in this manner beneficially allows each process to perform a computing operation upon a previously received segment concurrently with the receiving of another segment. Because the transmitting and receiving operations are performed in a non-blocking manner, they generally do not delay or interfere with the computing operation. As a result, time lost in waiting is minimized. Therefore, this pipelining strategy beneficially reduces the amount of time required to complete the global combining or reducing operation.

A process may input to the computing operation both the most recently received segment and a second segment not received from the same process as the first segment. Specifically, in the first iteration of exchanging operation 204, the second segment may be a subset of the vector originally input to the process at the beginning of the global combining or reducing operation. It is noted that in the first pairing of processes, during the first transmission and receiving of segments, the computing operation may be omitted on account of no segment having previously been received from the current interaction partner.

As a concrete example, a process i and its interaction partner j may, at a given point in time, each have different data (i.e., vectors). Process i may transmit the second half of its data to process j, and process j may transmit the first half of its data to process i. Process i may then perform the computing operation upon the first halves of both quantities of data, and process j may perform the computing operation upon the second halves of both quantities of data. In doing so, the computing operation is performed upon one pair of segments at a time as described above.

Once all segments are exchanged and input to the computing operation, the output of the computing operation for each pair of segments may be concatenated to generate an intermediate result. The output of the computing operation for each pair of segments may be shorter in length than the combined length of the two input segments. In this case, the intermediate result is shorter in length than the combined length of the data input to the computing operation during a single iteration of exchanging operation 204. In an embodiment of the present invention, the length of the intermediate result is half the length of the combined input data. It is noted that this causes the size of the intermediate result to be reduced by a factor of two with each successive iteration of exchanging operation 204.

At determining operation 206, it is determined whether the distribution stage is complete. If not, control returns to pairing operation 202. It is contemplated that the distribution stage is defined to be complete after iterating over pairing operation 202 and exchanging operation 204 $\log_2 N$ times, where N is the number of processes engaged in the global reduce operation. In the preceding formula, $\log_2$ denotes a logarithm operation having a base of two. Accordingly, determining operation 206 may comprise determining whether the number of iterations determined by the preceding formula have been completed. For example, if 16 processors are engaged in the global reduce operation, $\log_2 16 = 4$ iterations may be required.

Determining operation 202 and exchanging operation 204 may behave differently on the second and subsequent iterations, e.g., after determining operation 206 has occurred at least once, than on the first iteration. In particular, instances of pairing operation 202 subsequent to the first pairing operation associate each process with an interaction partner with which the process has not previously been paired. Furthermore, exchanging operation 204 may operate upon the intermediate results of the previous iteration. Accordingly, the second segment input to the computing operation may be a subset of the intermediate result. It is noted that if the intermediate results after the previous iteration are shorter in length than the data existing as of the beginning of the previous iteration, exchanging operation 204 will exchange less data than in the previous iteration. For example, if each iteration halves the size of the data, exchanging operation 204 will exchange half as much data as in the previous iteration.

The gathering stage begins with pairing operation 208. At pairing operation 208, the plurality of processes are paired. Pairing operation 208 may be performed so that each process has a maximum of one interaction partner. It is neither required nor disallowed for each process to be paired with the same interaction partners selected in pairing operation 202 during the distribution stage. However, if pairing operation 208 has already been performed at least once, each process may be either associated with an interaction partner with which the process has not previously been paired by pairing operation 208 or associated with no interaction partner.

At retrieving operation 210, results of one or more computing operations are transmitted. The results include the output of one or more computing operations performed at the process which is transmitting the results. On pairings subsequent to the first pairing, the results may also include the results of computing operations performed at other processes and received during previous iterations of retrieving operation 210. Remote Direct Memory Access may be used to transmit the results in a non-blocking manner. It is noted that a given process may not have been paired by pairing operation 208. In this case, the unpaired process may omit participating in retrieving operation 210.

In an embodiment of the present invention, one member of each pair of processes transmits results of one or more computing operations to its interaction partner. The MPI_REDUCE operation as defined in the Message Passing Interface may be implemented using this embodiment. In another embodiment of the present invention, each process transmits results of one or more computing operations to its interaction partner as in the previous embodiment and additionally receives results of one or more computing operations from its interaction partner. The MPI_ALLREDUCE operation as defined in the Message Passing Interface may be implemented using this embodiment.

At determining operation 212, it is determined whether the gathering stage is complete. If not, control returns to pairing operation 208. It is noted that after $\log_2 N$ iterations of the preceding two operations, where N is the number of processes engaged in the global combining or reducing operation, the combined result is completely received at its destination. Because this is the goal of the gathering stage, the gathering stage may be considered to be complete after $\log_2 N$ iterations. Accordingly, determining operation 212 may comprise determining whether $\log_2 N$ iterations have been completed. For example, if 16 processors are engaged in the global combining or reducing operation, $\log_2 16=4$ iterations may be required.

Using the method of the present invention, a global reduce operation may perform as few as $$\frac{(N-1)}{N}L$$

computing operations, where N is the number of processes and L is the length of the vector in bytes. It is believed that this represents a theoretical lower bound. The maximum number of bytes sent and received by each process may be as low as $$3\frac{(N-1)}{N}L$$

when the results of the global reduce operation are received at a single process, such as during an MPI_REDUCE operation. When the results of the global reduce operation are received at all processes participating in the global reduce, the maximum number of bytes sent and received by each process may still be as low as $$4\frac{(N-1)}{N}L.$$

The maximum number of bytes sent and received by a process at a given time is $$2\left(\frac{1}{q}\right)L,$$

wherein q is the number of segments in which the data are divided before transmission. Specifically, $$\left(\frac{1}{q}\right)L$$

bytes must be transmitted in each direction. This is true regardless of whether the result is received at a single process or at all processes.

It is emphasized that these figures are significant improvements over the prior art techniques discussed above. In the prior art techniques, $$3\left(\frac{1}{q}\right)L$$

bytes must be transmitted in order to perform a global reduce operation wherein the result is received at a single process. Of this total, $$\left(\frac{1}{q}\right)L$$

bytes must be sent and $$2\left(\frac{1}{q}\right)L$$

bytes must be received. To perform a global reduce operation wherein the result is received at all processes, $$6\left(\frac{1}{q}\right)L$$

bytes must be transmitted. Of this total, $$3\left(\frac{1}{q}\right)L$$

bytes must be transmitted in each direction. These improvements are aided by the fact that half of the communication performed by any process can be overlapped with computation as a result of Remote Direct Memory Access and the fact that communication may be performed bidirectionally.

The amount of time required to perform a global reduce operation using the method of the present invention, wherein the result is received at a single process, is:

$$\frac{(N-1)}{N}L\gamma + \frac{q+1}{q}L\beta', \text{ if } \gamma > \beta'$$

$$2L\beta', \text{ if } \gamma \le \beta'$$

where γ is the reduce operation cost per byte, β' is the communication cost per byte when there are both transmissions and receives. Furthermore, $$\beta' < \frac{\beta}{2}.$$

It is emphasized that this time is less than the time required by the previously discussed prior art solutions.

Figure 3:
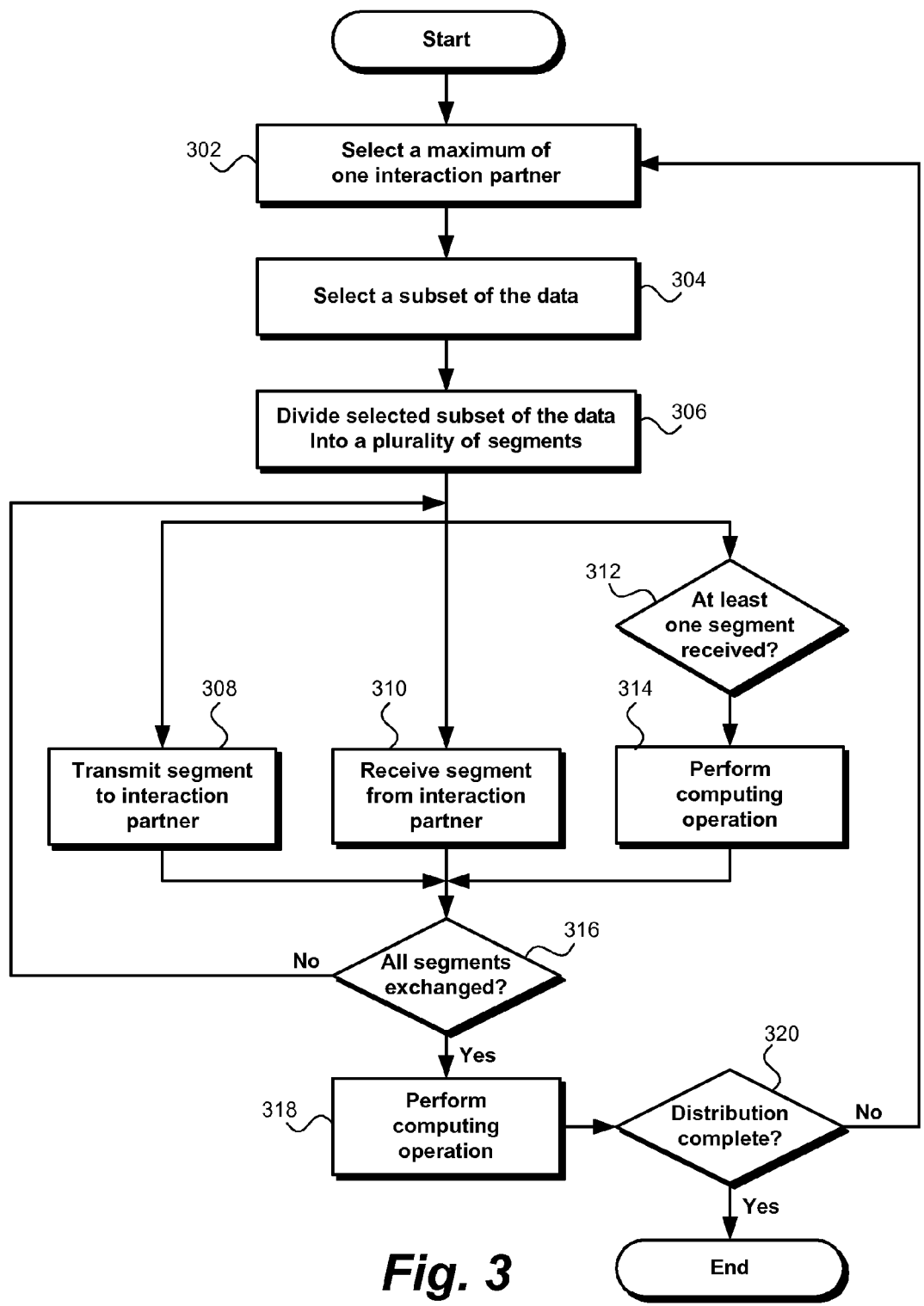
FIG. 3 demonstrates a flowchart of exemplary operations to distribute a computing operation among a plurality of processes.

Turning now to FIG. 3, a flowchart of exemplary operations to distribute a computing operation among a plurality of processes is shown. FIG. 3 demonstrates the distribution stage shown in FIG. 2 in additional detail and from the perspective of a single process. It is emphasized that each process contributing to the distributed computing operation individually performs the operations listed below. This does not mean that each process acts in isolation. To the contrary, many of the operations detailed below effect interaction between two or more processes.

Before performing the exemplary operations shown here, a number may be assigned to each of the plurality of processes contributing to the distributed computing operation. Assigning unique numbers to each process beneficially assists an exemplary pairing algorithm demonstrated below. No two processes are assigned the same number. The numbers may be consecutive integers beginning with zero. It is contemplated that the unique numbers are unchanged over at least the course of a single global reduce operation. In one embodiment of the present invention for MPI_REDUCE and MPI_ALLREDUCE implementations, a rank of a process defined by MPI can be used for this purpose.

At the beginning of the exemplary operations shown here, each process begins with separate input data. The data may be a subset of an input vector which was subdivided among the plurality of processes contributing to the distributed computing operation. It is contemplated that the quantity of input data located at a process is equal to the quantity of input data located at any other process. If both of these assumptions are true, the input data located at the process may represent a proportion of the input vector equal to $$\frac{1}{N},$$

where N is the number of processes contributing to the distributed computing operation.

A wide variety of data may be input to a process. Specifically, any of the types of data used as examples of possible input vectors may also be input to an individual process. A large quantity of data, possibly multiple kilobytes, multiple megabytes or even longer in length, may be input to a process. The data may be of any of a wide variety of data types. Possible data types may include without limitation integers, floating point numbers, character strings and arrays of other data types. The data type may also be a data structure comprising a plurality of typed subfields. The data may have a highly complex data type. In an embodiment of the present invention, the data may be of any data type defined by the Message Passing Interface, including derived data types based on core MPI data types. For a particular distributed computing operation, the data input to a process may be required to match a specified data type.

The distributed computing operation may be invoked upon receiving a directive to perform a global reduce operation configured to distribute a computing operation among a plurality of processes and to gather results of the computing operation such that the results are received at a single process. In this case, it is contemplated that after performing the distributed computing operation, results of the distributed computing operation are gathered such that they are received at a single process. For example, the exemplary operations demonstrated in FIG. 3 may be followed by operations such as those demonstrated in FIG. 6. In an embodiment of the present invention, the received directive specifies that operations implementing the MPI_REDUCE primitive defined by the Message Passing Interface shall be performed.

The distributed computing operation may also be invoked upon receiving a directive to perform a global reduce operation configured to distribute a computing operation among a plurality of processes and to gather results of the computing operation such that the results are received at all processes which performed the computing operation. In this case, it is contemplated that after performing the distributed computing operation, results of the distributed computing operation are gathered such that they are received at each of the plurality of processes. For example, the exemplary operations demonstrated in FIG. 3 may be followed by operations such as those demonstrated in FIG. 7. In an embodiment of the present invention, the received directive specifies that operations implementing the MPI_ALLREDUCE primitive defined by the Message Passing Interface shall be performed.

At pairing operation 302, each process selects zero or more processes with which to interact. The selected processes are referred to as interaction partners.

In an embodiment of the present invention, a process may select a maximum of one interaction partner. It is emphasized that as a result of each of the plurality of processes performing the pairing operation, each process has a maximum of one interaction partner. It is contemplated that each process will select exactly one interaction partner in most cases. However, selecting no interaction partner may be useful for adapting the method of the present invention to a wide variety of systems, architectures and computing operations. In particular, the number of processes contributing to the distributed computing operation is not required to be a power of two. To facilitate using the method of the present invention with a number of processes which is not a power of two, it may be beneficial for a particular process to omit selecting an interaction partner during a given iteration. Indeed, if the number of processes is odd, it is logically impossible for each process to have exactly one interaction partner. If a process selects no interaction partner, control passes to determining operation 316 for that process.

In another embodiment of the present invention, a process may select more than one interaction partner. This embodiment may beneficially allow more than two processes to exchange data according to the pipelining strategy of the present invention. Those skilled in the art will appreciate that the exemplary algorithm demonstrated in FIG. 3 can be readily modified to allow more than two processes to simultaneously participate in a pipelined exchange of data.

The exclusive or (XOR) of the number of the process and a mask may be calculated. The pairing operation may then performed such that the process is associated with an interaction partner having a number equal to the result of the calculating operation. The first time pairing operation 302 is performed, the mask may contain a binary representation of the number one. It is noted that in this case, an interaction partner is selected having a number equal to the number of the process with the least significant bit inverted. It is further noted that this algorithm will cause the interaction partner selected by the process to likewise select the process as its interaction partner.

At selecting operation 304, each process selects a subset of the data located at the process. The subset of the data may include half of the data. The data may be located in random access memory coupled to the processor executing the process. The data may also be stored within other types of computer-readable storage media. It is noted that the first time selecting operation 304 is performed, the data are the original inputs to the process.

In an embodiment of the present invention, if the number of the process is less than the number of its interaction partner, the process selects the second half of its data as the subset. If the number of the process is greater than the number of its interaction partner, the process selects the first half of its data as the subset.

At dividing operation 306, each process divides the selected subset of the data into a plurality of segments. It is noted that the dividing operation need not physically rearrange the selected subset of the data. Rather, the division may comprise an internal awareness of the identity and boundaries of each segment. In an embodiment of the present invention, an array may be configured to store for each segment byte offsets within the overall data corresponding to that segment. Using this method, an exemplary selected subset of the data 4,096 bytes in length may remain in its current location. To divide the selected subset of the data, an array may be instantiated with two elements. The first element denotes the fact that the first segment comprises byte offsets 0 through 2,047, and the second element denotes the fact that the second segment comprises byte offsets 2,048 through 4,095. In another embodiment of the present invention, the process may iterate over a loop one time per segment and may dynamically calculate the appropriate byte offsets for the current segment upon each iteration.

The number of segments into which the selected subset of the data is divided may be determined in order to optimize the performance of the distributed computing operation. A larger number of segments may beneficially increase the overlap in time between data transfer and computation. This is because a first pair of segments must be completely exchanged before the computing operation may begin. Accordingly, computation is delayed by the amount of time required to exchange one pair of segments. It follows that $$\frac{1}{M}$$

of the selected subset of the data must be transmitted before any computation is performed, where M is the number of segments. Therefore, increasing the number of segments decreases the delay before computation begins. All other things being equal, increasing the number of segments would decrease the time required to perform the distributed computing operation. However, increasing the number of segments may also increase the network overhead required for data transmission. A number of segments may therefore be selected in order to optimally balance these two factors for a given implementation. In an embodiment of the present invention, the selected subset of the data is divided into two segments.

It is noted that the number of segments need not be the same for two different global reduce operations. The number of segments need not even be the same for two different iterations of dividing operation 306 within the same global reduce operation. For example, a number of segments may be selected such that each segment is as large as possible without exceeding a maximum packet size defined by a network protocol.

At transmitting operation 308, each process transmits a segment resulting from dividing operation 306 to the interaction partner of the process. The transmission of the segment is non-blocking. To achieve this goal, the segment may be transmitted via Remote Direct Memory Access. It is contemplated that the process does not make further use of the segment once transmitted. However, the process need not expressly deallocate the memory belonging to the segment, overwrite the segment with zeroes or other filler data or otherwise discard the segment.

At receiving operation 310, each process receives a segment from its interaction partner. It is contemplated that receiving operation 310 is performed concurrently with transmitting operation 308. As with transmitting operation 308, the receiving of the segment is non-blocking. To achieve this goal, the segment may be received via Remote Direct Memory Access.

At determining operation 312, it is determined whether at least one segment has been received from the interaction partner. If so, processing continues with computing operation 314. If not, control passes to determining operation 316. This is necessary because computing operation 314 may be configured to receive as input a segment received from the current interaction partner. However, during the first exchange of segments via transmitting operation 308 and receiving operation 310 with an interaction partner, no preceding segment has been entirely received from the interaction partner. Accordingly, computing operation 314 may not have input data during the first exchange of segments with an interaction partner.

At computing operation 314, each process performs a computing operation on a first segment previously received and a second segment of data not received from the same process as the first segment. Specifically, the first segment may have been received from the current interaction partner. The second segment may have resulted from dividing operation 306. It is noted that on the first iteration, because dividing operation 306 received as input a selected subset of the original input, the second segment is itself a subset of the original input. The length of the output of computing operation 314 for each pair of segments may be shorter than the sum of the lengths of the two input segments. In an embodiment of the present invention, the output of computing operation 314 is half the size of the combined length of the segments input to computing operation 314.

It is emphasized that the computing operation may be any of a wide variety of computing tasks known in the art. The computing operation may be a relatively simple operation. For example, it may determine the sum of the data in the vector. It may also determine the minimum and/or maximum value found in the vector. The computing operation may also be a highly complex operation such as predicting future weather conditions or simulating scientific phenomena. It is noted that the computing operation may comprise other computing operations.

Computing operation 314 is performed concurrently with transmitting operation 308 and receiving operation 310. However, it is not required that the three operations begin and end at precisely the same time. For example, computing operation 314 may terminate before transmitting operation 308 and/or receiving operation 310 complete. Conversely, transmitting operation 308 and receiving operation 310 may terminate before computing operation 314 determines a result. It is emphasized that performing computing operation 314 concurrently with the transmission and receiving of data beneficially reduces the total time required to complete the distributed computing operation. Because the transmitting and receiving operations are performed in a non-blocking manner, they generally do not delay or interfere with the computing operation. As a result, time lost in waiting is minimized. Therefore, this pipelining strategy beneficially reduces the amount of time required to complete the distributed computing operation.

At determining operation 316, each process determines whether all segments in the selected subset of the data have been transmitted and whether all segments expected from the interaction partner have been received. If one or more segments has not been transmitted or received, control returns to transmitting operation 308. If all segments have been exchanged, processing continues with computing operation 318.

At computing operation 318, the same operation performed by computing operation 314 is applied to a final pair of segments. The first segment may be the final segment received from the current interaction partner. The second segment may be the final segment resulting from dividing operation 306. Computing operation 318 is necessary because computing operation 314 is applied to segments which have been completely received from the interaction partner. Therefore, once all segments have been exchanged, at least one received segment has not been input to computing operation 314.

In an embodiment of the present invention, computing operation 318 is not performed upon the final pair of segments until after the next iteration of pairing operation 302. As a result, a first pair of segments may be exchanged with the next interaction partner concurrently with performing computing operation 318 on the final pair of segments. This embodiment beneficially increases the overlap in time between data transfer and computation, thus decreasing the total time required to complete the distributed computing operation. In an embodiment of the present invention, for the final pairing of processes, computing operation 318 is not performed concurrently with any data transmission. In another embodiment of the present invention, for the final pairing of processes, computing operation 318 is performed concurrently with the initial exchange of data performed to gather results of the computing operation. For example, the final computing operation 318 may be performed concurrently with transmitting operation 606 of FIG. 6 or transmitting operation 706 of FIG. 7.

At determining operation 320, each process determines whether the distribution of the computing operation is complete. If so, the present set of operations is complete. However, processing may continue with a gathering stage, such as the exemplary operations demonstrated in FIG. 6 or FIG. 7, in order to gather the results. If the distribution of the computing operation is not complete, control returns to pairing operation 302.

It is contemplated that the distribution stage is defined to be complete after $\log_2$ N iterations, where N is the number of processes engaged in the global reduce operation. In the preceding formula, $\log_2$ denotes a logarithm operation having a base of two. Accordingly, determining operation 320 may comprise determining whether the number of iterations determined by the preceding formula has been completed. For example, if 16 processors are engaged in the global reduce operation, $\log_2 16=4$ iterations may be required.

The output of computing operations 314 and 318 for each pair of segments may be concatenated to generate an intermediate result. It is noted that if computing operations 314 and 318 output a result whose size is less than the sum of the sizes of the inputs to the computing operation, the size of the intermediate result will be smaller than the sum of the sizes of the data located at the pair of processes at the beginning of the previous iteration. It is noted that in this case, the size of the intermediate result is reduced with each successive iteration.

In an embodiment of the present invention, the global reduce operation distribution is performed using recursive halving. In this embodiment, computing operations 314 and 318 may both output a result whose size is half the sum of the sizes of the inputs to the computing operation. Therefore, the size of the intermediate result is half the sum of the sizes of the data located at the pair of processes at the beginning of the previous iteration. Furthermore, the intermediate result after each iteration is half the size of the intermediate result after the previous iteration.

If control returns to pairing operation 302, significant differences exist between the first iteration and subsequent iterations. Notably, pairing operation 302 associates the process with a subsequent interaction partner with which the process has not previously been paired. In an embodiment of the present invention, the number of the interaction partner is calculated using an exclusive or operation as previously discussed, but wherein the mask contains a value not used in a preceding pairing operation. Specifically, the mask may contain the value of the mask used in the preceding iteration of pairing operation 302 shifted one bit to the left. It is noted that in this case, an interaction partner is selected having a number equal to the number of the process with one bit inverted, wherein the inverted bit position is the next most significant bit compared to the inverted bit position in the previous selection of interaction partners.

Selecting operation 304 in subsequent iterations may select half of the intermediate result of the preceding iteration. As a result, subsequent iterations may operate on the intermediate result of the preceding iteration rather than directly on the original input data. In particular, the second segment input to computing operations 314 and 318 in subsequent iterations may be a subset of the intermediate result rather than of the original input.

It is contemplated that the data input to each process are of equal length. In this case, at the end of the distribution stage, each process will have a proportion of the overall result equal to $$\frac{1}{N},$$

where N is the number of processes contributing to the distributed computing operation.

Figure 4:
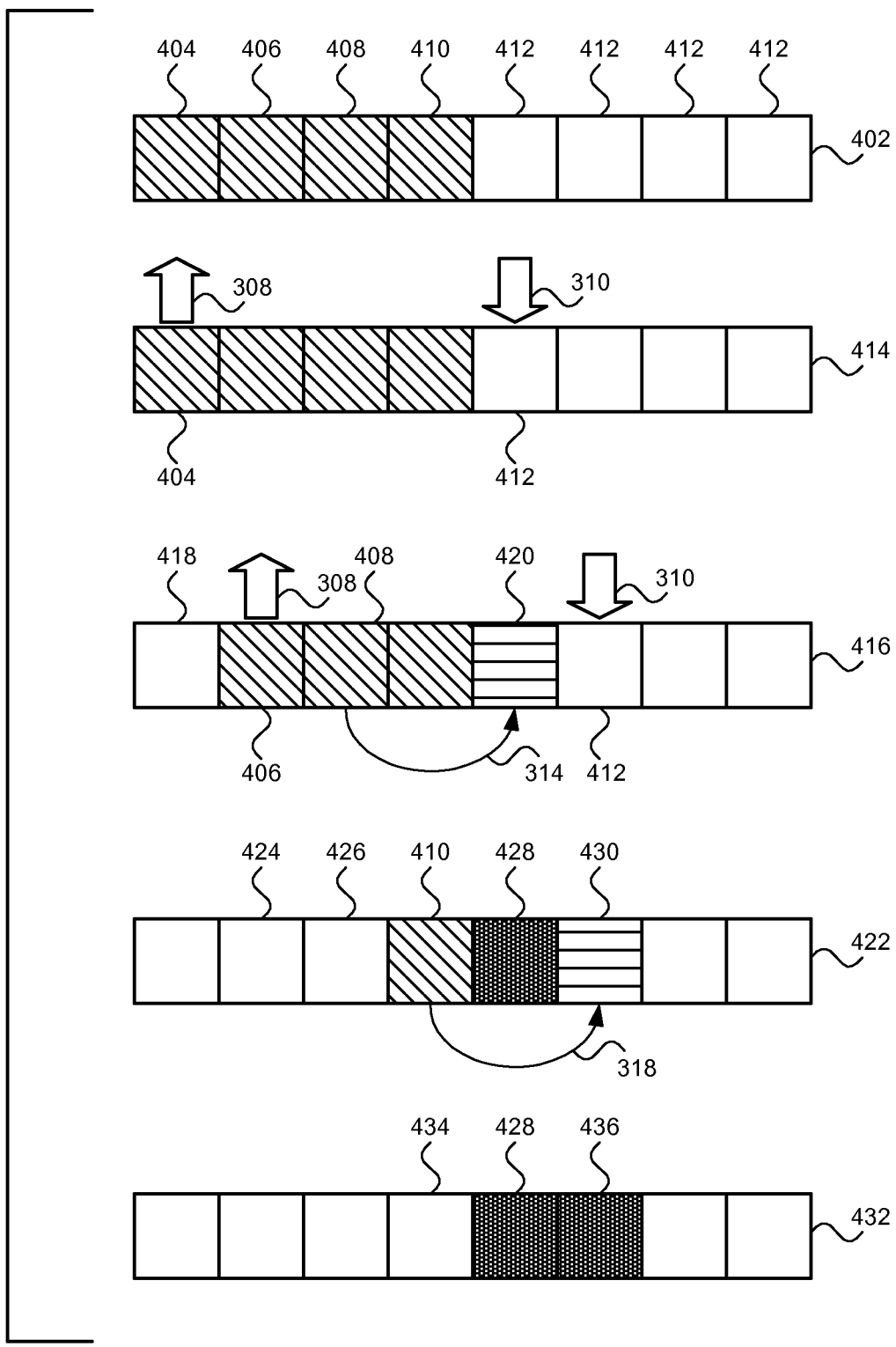
FIG. 4 graphically demonstrates changes in the data located at an individual process as the process participates in an exemplary distributed computing operation.

FIG. 4 graphically demonstrates changes in the data located at an individual process as the process participates in an exemplary distributed computing operation. In FIG. 4, data segments 404, 406, 408, 410 initially located at process are depicted as squares with a diagonal line pattern. Data received from the interaction partner of the process are depicted as squares with a horizontal line pattern. Data resulting from computing operations performed at the process are depicted as squares with a dotted pattern. Locations in a storage medium not containing data relevant to the distributed computing operation are depicted as squares with a white pattern. Each horizontal set of squares depicts the contents of computer readable storage coupled to the process. Sets of squares closer to the bottom of the page represent states of the process at successively later points in time.

In a first state 402, initial data segments 404, 406, 408, 410 are located at the process. The initial data may be the original inputs to the process. The initial data may also be an intermediate result of previous computing operations. The data may be stored in random access memory coupled to a processor executing the process. The data may also be stored within other types of computer-readable storage media.

The process may instantiate a buffer 412 intended to hold received segments and results of computing operations. The buffer may be of a temporary nature. The buffer 412 may be located in the same random access memory or other storage medium at which the initial data segments 404, 406, 408, 410 are located. A request may be made to the operating system to allocate specific locations in memory at which to store the buffer 412. It is noted that many operating systems known in the art do not overwrite the previous contents of memory locations before allocating them to a process. While the buffer 412 is graphically depicted as empty space, the process need not overwrite the buffer with zeroes or other filler data or otherwise obliterate the previous contents in the buffer at the time the buffer is instantiated. It is contemplated that any existing data in the buffer at the time of memory allocation will be overwritten by received segments.

In a second state 414, the process has selected the leftmost two quantities of data 404, 406 as the subset of the data to be transmitted to an interaction partner. Accordingly, a segment 404 of the selected data is being transmitted 308 to an interaction partner. The segment 404 may consist of one quarter of the initial data. Concurrently, a second segment of data is being received 310 from the same interaction partner. The second segment of data is being written to a location within the buffer 412. The transmission 308 and receiving 310 operations are performed in a non-blocking manner. In an embodiment of the present invention, the transmission 308 and receiving 310 operations are performed via Remote Direct Memory Access. It is noted that no computing operation has yet been performed, as an entire segment has not yet been received from the interaction partner.

In a third state 416, another segment 406 of the selected subset of the data is being transmitted 308 to an interaction partner. The segment 406 may consist of one quarter of the initial data. The transmitted segment 406 is distinct from the segment 404 being transmitted 308 in the second state 414. Concurrently, a second segment of data is being received 310 from the same interaction partner. The received segment is distinct from the segment being received 310 in the second state 414. The second segment of data is being written to a location within the buffer 412. As in the second state, the transmission 308 and receiving 310 are performed in a non-blocking manner. In an embodiment of the present invention, the transmission 308 and receiving 310 are performed via Remote Direct Memory Access.

The segment 404 being transmitted 308 during the second state has ideally been completely transmitted. If this is the case, the completely transmitted segment is no longer required 418 by the exemplary distributed computing operation. It is noted that while data which is no longer required is graphically depicted by white space, the process need not expressly deallocate memory belonging to the data, overwrite the data with zeroes or other filler data or otherwise discard the data.

Ideally, the segment 420 being received during the second state 414 has been completely received. If this is the case, the process may perform a computing operation 314 upon the received segment 420 and a segment 408 of the initial data. The segment 404 may consist of one quarter of the initial data. It is noted that the segment 408 of the initial data is not part of the subset of the data which was selected. The computing operation 314 may be any of a wide variety of computing tasks known in the art. Computing operation 314 may combine the two segments 408, 420 input to it. It is emphasized that the computing operation 314 is performed concurrently with transmitting 308 and receiving 310 two other segments.

In a fourth state 422, no more segments remain to be transmitted and received. The computing operation 314 being performed in the third state 416 has generated a result 428. As a result, the segment of input data 408 input to the computing operation in the third state is no longer required 426.

The segment 406 being transmitted 308 during the third state 416 has ideally been completely transmitted. If this is the case, the completely transmitted segment is likewise no longer required 424 by the exemplary distributed computing operation.

Ideally, the segment 430 being received during the third state 416 has been completely received. If this is the case, the process may perform a computing operation 318 upon the received segment 430 and a segment 410 of the initial data. The segment 410 may consist of one quarter of the initial data. It is noted that the segment 410 of the initial data is part of the subset of the data which was not selected. The computing operation 318 may be the same operation as computing operation 314. Computing operation 318 may be any of a wide variety of computing tasks known in the art. Computing operation 318 may combine the two segments 410, 430 input to it.

In a fifth state 432, the computing operation 318 being performed in the fourth state 422 has generated a result 436. As a result, the segment 410 of input data input to the computing operation in the fourth state is no longer required 434.

The result 428 of computing operation 314 performed during the third state 416, along with the result 436 of computing operation 318 performed during the fourth state 422, may represent an intermediate result. Such an intermediate result may be input to another iteration of the distribution stage. The combined result 428, 436 may also represent a final result. The result 428, 436 may be transmitted at this point to a presentation unit which displays the result to the user in text or graphical format.

Figure 5:
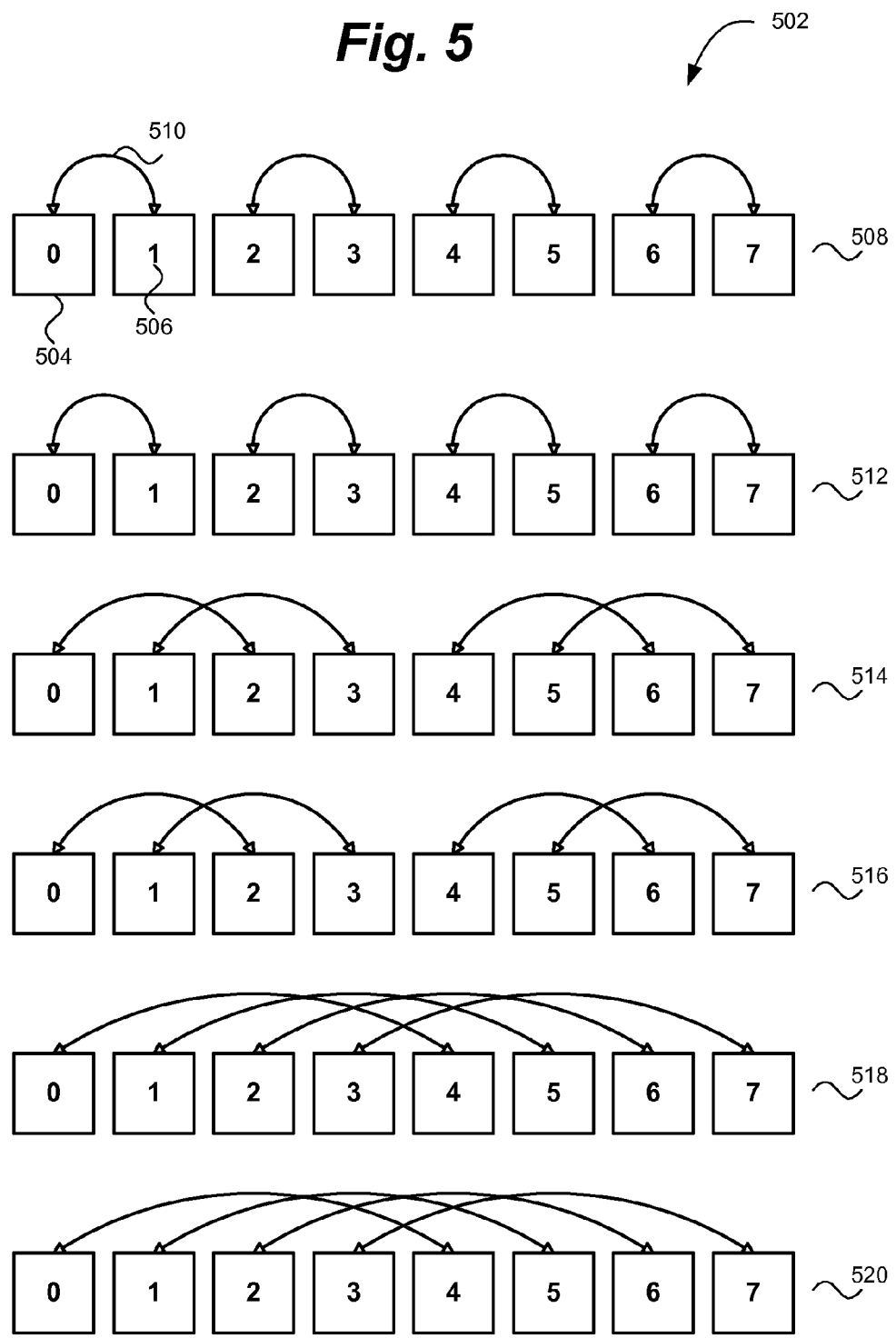
FIG. 5 graphically demonstrates an exemplary exchange of data among a plurality of processes contributing to a distributed computing operation.

FIG. 5 illustrates an exemplary exchange of data among a plurality of processes contributing to a distributed computing operation.

Each horizontal set of squares graphically demonstrates the actions being performed by a plurality of processes at a specific point in time. As with FIG. 4, sets of squares closer to the bottom of the page represent states of the system at successively later points in time.

An exemplary parallel computing system 502 comprises a plurality of processes 504, each of which is contributing to a global reduce operation. The global reduce operation may be implemented via the MPI_REDUCE or MPI_ALLREDUCE primitives defined by the Message Passing Interface. The exemplary system comprises eight processes. It is emphasized, however, that the method demonstrated by the exemplary system may be applied to systems having any number of processes. A quantity of data is initially input to each process.

Each process is assigned a number 506. No two processes are assigned the same number. In the exemplary system, the numbers are consecutive integers beginning with zero. Because eight processes exist, the highest number is therefore seven. The numbers are unchanged throughout the sequence of operations demonstrated in FIG. 5.

It is noted that in the exemplary system, when dividing a selected subset of the data into segments as described above, each process is configured to divide the data into exactly two segments.

In a first state 508, each process 504 has received a quantity of data as input. Each process is paired with exactly one interaction partner. In the exemplary data exchange, the processes are paired according to the previously defined pairing algorithm. Specifically, each process calculates the exclusive or of its number 506 and a mask, wherein the mask contains a binary representation of the number one. Each process is then paired with the process having a number equal to the result of the calculating operation. As a result, each process selects an interaction partner having a number equal to its own number with the least significant bit inverted. It is noted that this algorithm will cause the interaction partner selected by a process to likewise select that process as its interaction partner.

Each process 504 then exchanges 510 a pair of segments with its interaction partner. As the term is used throughout FIG. 5, exchanging means that each process simultaneously transmits a segment of data to its interaction partner and receives a segment of data from its interaction partner. In all exchanges demonstrated by FIG. 5, the transmission and receiving are non-blocking and may be achieved via Remote Direct Memory Access. Each segment transmitted may consist of one quarter of the data input to the process transmitting the segment.

In a second state 512, each process 504 remains paired with the same interaction partner as in the first state 508. Each process exchanges 510 another pair of segments with its interaction partner. Again, each segment transmitted may consist of one quarter of the data input to the process transmitting the segment.

Concurrently with the data exchange 510, each process performs a computing operation. The segment received in the first state 508 and a segment of the data initially input to the process are input to the computing operation. It is emphasized that computing operations performed throughout FIG. 5 may be any of a wide variety of computing tasks known in the art. Specifically, computing operations may be reducing operations.

In a third state 514, each process has already exchanged all of its data with its initial interaction partner. This is the case because the data to be transmitted by each process were divided into two segments, and two exchanges have been performed with the current interaction partner. Therefore, each process 504 is paired with another interaction partner with which the process has not previously been paired. In the exemplary data exchange, the second pairing is also performed according to the previously defined pairing algorithm. Specifically, each process calculates the exclusive or of its number 506 and a mask. The mask is calculated by shifting the value of the mask used in the first state 508 one bit to the left. Because the value of the mask in the first state 508 was a binary representation of one, the value of the mask in the third state 514 is a binary representation of two. As a result, each process selects an interaction partner having a number equal to its own number with the second least significant bit inverted.

Each process 504 then exchanges 510 a pair of segments with its new interaction partner. Each segment may consist of one quarter of the intermediate data located at the process transmitting the segment as of the beginning of the third state 514.

Concurrently with the data exchange 510, each process performs another computing operation. The segment received in the second state 512 and a segment of the intermediate result located at the process as of the beginning of the third state 514 are input to the computing operation.

In a fourth state 516, each process 504 remains paired with the same interaction partner as in the third state 514. Each process exchanges 510 another pair of segments with its interaction partner. Again, each segment transmitted may consist of one quarter of the intermediate data located at the process transmitting the segment as of the beginning of the third state 514.

Concurrently with the data exchange 510, each process performs another computing operation. The segment received in the third state 514 and a segment of the intermediate result located at the process as of the beginning of the third state 514 are input to the computing operation.

In a fifth state 518, each process 504 has already exchanged all of its data with its second interaction partner. Therefore, each process 504 is paired with another interaction partner with which the process has not previously been paired. In the exemplary data exchange, the third pairing is also performed according to the previously defined pairing algorithm. Specifically, each process calculates the exclusive or of its number 506 and a mask. The mask is calculated by shifting the value of the mask used in the third state 514 one bit to the left. Because the value of the mask in the third state 514 was a binary representation of two, the value of the mask in the fifth state 518 is a binary representation of four. As a result, each process selects an interaction partner having a number equal to its own number with the third least significant bit inverted.

Each process 504 then exchanges 510 a pair of segments with its interaction partner. Each segment may consist of one quarter of the intermediate data located at the process transmitting the segment as of the beginning of the fifth state 518.

Concurrently with the data exchange 510, each process performs another computing operation. The segment received in the fourth state 516 and a segment of the intermediate result located at the process as of the beginning of the fifth state 518 are input to the computing operation.

In a sixth state 520, each process 504 remains paired with the same interaction partner as in the fifth state 518. Each process exchanges 510 another pair of segments with its interaction partner. Again, each segment transmitted may consist of one quarter of the intermediate data located at the process transmitting the segment as of the beginning of the fifth state 518.

Concurrently with the data exchange 510, each process performs another computing operation. The segment received in the fifth state 518 and a segment of the intermediate result located at the process as of the beginning of the fifth state 518 are input to the computing operation. It is noted that at this point, each process has exchanged all data with each of three different interaction partners. However, the data exchanged during the sixth state 520 have not been input to the computing operation. Thus, a final computing operation is performed. The segment received in the sixth state 520 and a segment of the intermediate result located at the process as of the beginning of the fifth state 518 are input to the computing operation. In an embodiment of the present invention, data are not transmitted concurrently with the final computing operation. In another embodiment of the present invention, the final computing operation is performed concurrently with the initial data exchanged performed to gather results of the computing operation. For example, the final computing operation may be performed concurrently with transmitting operation 606 of FIG. 6 or transmitting operation 706 of FIG. 7.

In an embodiment of the present invention, the distribution stage of a global reduce operation is considered to be complete after all segments are exchanged with each of $\log_2 N$ interaction partners, where N is the number of processes engaged in the global reduce operation. The exemplary system 502 comprises eight processes 504. Therefore, this condition is fulfilled for the exemplary system at the end of the sixth state 520, because $\log_2 8 = 3$.

Figure 6:
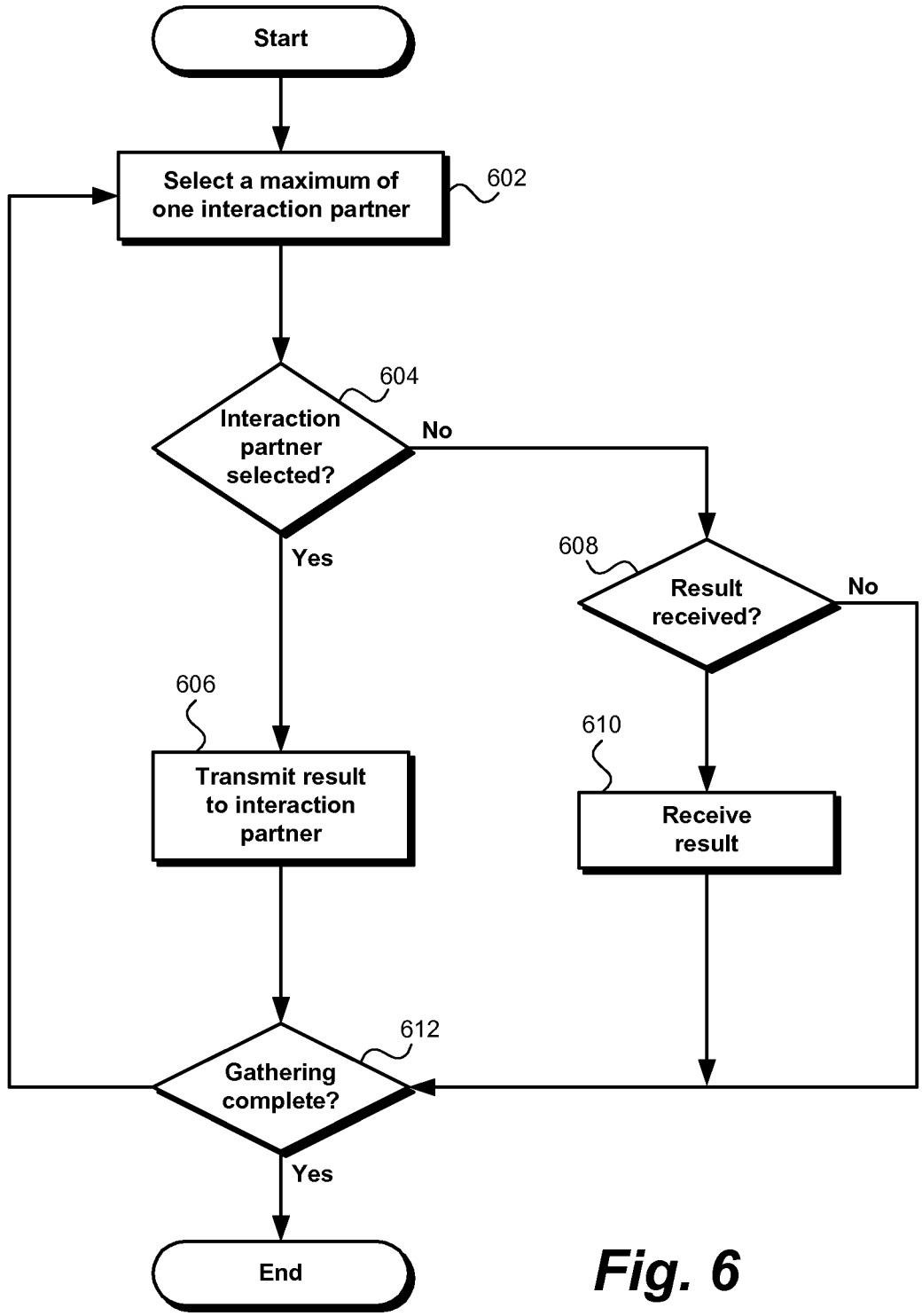
FIG. 6 demonstrates a flowchart of exemplary operations to gather results of a computing operation distributed among a plurality of processes, wherein the results are received at a single process.

Turning now to FIG. 6, a flowchart of exemplary operations to gather results of a computing operation distributed among a plurality of processors is demonstrated. The results are received at one of the plurality of processes. FIG. 6 demonstrates an embodiment of the gathering stage shown in FIG. 2, providing additional detail and adopting the perspective of a single process. It is emphasized that each process contributing to the gathering operation individually performs the operations listed below. This does not mean that each process acts in isolation. To the contrary, many of the operations detailed below effect interaction between two or more processes.

Gathering results may be performed in conjunction with a distributed computing operation as demonstrated in FIG. 3. Specifically, the exemplary operations shown herein for gathering results may be performed subsequently to a distributing computing operation in order to retrieve results of the distributed computing operation. At the conclusion of the exemplary distributed computing algorithm demonstrated in FIG. 3, a subset of the overall result is located at each process contributing to the distributed computing operation. For a specific computing operation and input vector, the quantity of result data located at a process may equal the quantity of result data located at any other process. In this case, the result data located at the process may represent a proportion of the total result of the distributed computing operation equal to $$\frac{1}{N},$$

where N is the number of processes which contributed to the distributed computing operation. If results are gathered subsequently to a distributed computing operation, the same processes which participated in the distributed computing operation may be reused to gather the results.

It is emphasized that gathering results need not directly follow a distributed computing operation. Gathering results, as contemplated by the present invention, may be performed to retrieve arbitrary data from a plurality of processes at a single process. Furthermore, gathering results as contemplated by the present invention may be performed in conjunction with algorithms for distributing a computing operation among a plurality of processes not contemplated by the present invention. In either case, data to be gathered are initially located at each process.

Gathering results may have been invoked on account of receiving a directive to perform a global reduce operation configured to distribute a computing operation among a plurality of processes and to gather results of the computing operation such that the results are received at a single process. In this case, it is contemplated that a distributed computing operation, such as the exemplary algorithm demonstrated in FIG. 3, is performed prior to gathering results. This is because the exemplary operations demonstrated by FIG. 6 are configured to gather the results of a distributed computing operation which has already been performed. In an embodiment of the present invention, the received directive specifies that operations implementing the MPI_REDUCE primitive defined by the Message Passing Interface shall be performed.

Before performing the exemplary operations shown here, a number may be assigned to each of the plurality of processes from which results are gathered. Assigning unique numbers to each process beneficially assists an exemplary pairing algorithm demonstrated below. No two processes are assigned the same number. The numbers may be consecutive integers beginning with zero. It is contemplated that the unique numbers are unchanged over at least the course of a single global reduce operation. If results are gathered subsequently to a distributed computing operation, it is contemplated that the same numbers are used as in the algorithm applied to pair the processes during the distributed computing algorithm. Furthermore, if processes participating in a distributed computing algorithm are reused to gather results, the number previously assigned to each process may still be available to operations for gathering the results. In this case, assigning numbers to each process prior to gathering results may be omitted, as the previously assigned numbers may be reused. In an embodiment of the present invention for MPI_REDUCE and MPI_ALLREDUCE implementations, a rank of a process defined by MPI can be used for this purpose.

At pairing operation 602, each process may select a process with which to interact. A process may also select no interaction partner. It is emphasized that as a result of each of the plurality of processes performing the pairing operation, each process has a maximum of one interaction partner.

In an embodiment of the present invention, a value equal to two to the power of a factor is calculated. If the number of the process is an exact multiple of double the calculated value, it selects an interaction partner having the number equal to the number of the process plus the calculated value. Otherwise, the process selects no interaction partner. In mathematical terms, if the number of the process is represented by i and the factor is represented by k, the process may determine the remainder resulting from dividing i by $2^{k+1}$. If and only if the remainder is zero, the process selects an interaction partner having the number $i+2^k$. The first time pairing operation 602 is performed, the factor may be a binary representation of the number one.

At determining operation 604, the process determines whether an interaction partner was selected. If no interaction partner was selected, control passes to determining operation 608. If an interaction partner was selected, processing continues with transmitting operation 606.

At transmitting operation 606, the process transmits a result of one or more computing operations to the interaction partner of the process. The result may comprise all results of computing operations currently located at the process.

At determining operation 608, the process (which did not select an interaction partner) determines whether a result of one or more computing operations was received. This determination may comprise waiting until data are received or until a predetermined amount of time has elapsed. If a result is received, processing continues with receiving operation 610. If no result is received, control passes to determining operation 612.

At receiving operation 610, the process receives a result of one or more computing operations from its interaction partner. As with transmitting operation 606, the receiving of the result is non-blocking. To achieve this goal, the result may be received via Remote Direct Memory Access. It is noted that in this case, a processor executing the process may need to take no action, as the receiving of the process may be effected by a network adapter.

At determining operation 612, each process determines whether the results are completely gathered. If so, processing may stop. If not, control returns to pairing operation 602. Each individual process may wait until all processes have reached determining operation 612 before returning to pairing operation 602.

After $\log_2$ N iterations of the exemplary gathering algorithm, where N is the number of processes engaged in the global reduce operation, the combined result is completely received at a single process. Accordingly, determining operation 612 may comprise determining whether $\log_2$ N iterations have been completed. For example, if 16 processes are engaged in the global reduce operation, determining operation 612 may determine whether $\log_2$ 16=4 iterations have been completed.

If control returns to pairing operation 602, significant differences exist between the first iteration and subsequent iterations. Notably, pairing operation 602 either associates the process with a subsequent interaction partner with which the process has not previously been paired or associates the process with no interaction partner. In an embodiment of the present invention, the number of the interaction partner is calculated using a calculating operation as previously discussed, but wherein the factor contains a value not used in a preceding pairing operation. Specifically, the factor may contain the value of the factor used in the preceding iteration of pairing operation 602 incremented by one.

Transmitting operation 606 in subsequent iterations may forward results received during previous iterations to the interaction partner selected for the current iteration. Specifically, the result of one or more computing operations transmitted by transmitting operation 606 may comprise results of computing operations received at the process during previous iterations. It follows that receiving operation 610 may likewise comprise receiving results of computing operations received at the process during previous iterations.

It is emphasized that at the conclusion of the exemplary gathering stage, the combined result of the distributed computing operation may be received at a single process, known in the art as the root. When pairing the processes according to the exemplary pairing algorithm described above, the result is received at the process having the number zero. It is noted that the numbers assigned to processes must therefore be selected so that the number zero is assigned to the process which should serve as the root.

Figure 7:
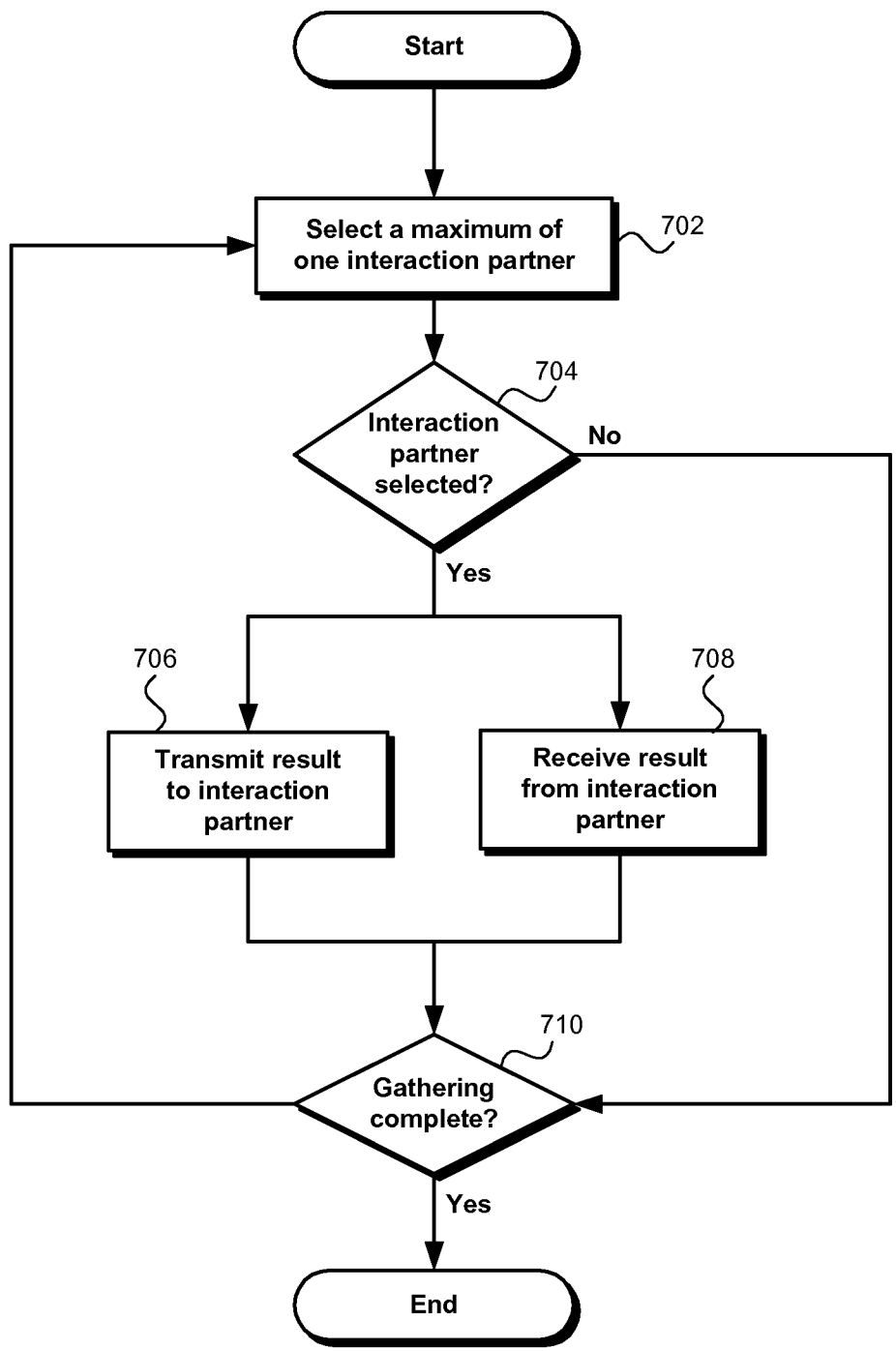
FIG. 7 demonstrates a flowchart of exemplary operations to gather results of a computing operation distributed among a plurality of processes, wherein the results are received at each of the plurality of processes.

Turning now to FIG. 7, another flowchart of exemplary operations to gather results of a computing operation distributed among a plurality of processes is demonstrated. In contrast to FIG. 6, the results are received at each of the plurality of processes. FIG. 7 demonstrates an embodiment of the gathering stage shown in FIG. 2, providing additional detail and adopting the perspective of a single process. It is emphasized that each process contributing to the gathering operation individually performs the operations listed below. This does not mean that each process acts in isolation. To the contrary, many of the operations detailed below effect interaction between two or more processes.

As with the case where results are received at a single process, gathering results such that each process receives the results may be performed in conjunction with a distributed computing operation as demonstrated in FIG. 3. Specifically, the exemplary operations shown herein for gathering results may be performed subsequently to a distributing computing operation in order to retrieve results of the distributed computing operation. At the conclusion of the exemplary distributed computing algorithm demonstrated in FIG. 3, a subset of the overall result is located at each process contributing to the distributed computing operation. For a specific computing operation and input vector, the quantity of result data located at a process may equal the quantity of result data located at any other process. In this case, the result data located at the process may represent a proportion of the total result of the distributed computing operation equal to $$\frac{1}{N},$$

where N is the number of processes which contributed to the distributed computing operation. If results are gathered subsequently to a distributed computing operation, the same processes which participated in the distributed computing operation may be reused to gather the results.

It is emphasized that as with the case where results are received at a single process, gathering results such that each process receives the results need not directly follow a distributed computing operation. Gathering results, as contemplated by the present invention, may be performed to retrieve arbitrary data from a plurality of processes at each of the plurality of processes. Furthermore, gathering results as contemplated by the present invention may be performed in conjunction with algorithms for distributing a computing operation among a plurality of processes not contemplated by the present invention. In either case, data to be gathered are initially located at each process.

Gathering results may have been invoked on account of receiving a directive to perform a global reduce operation configured to distribute a computing operation among a plurality of processes and to gather results of the computing operation such that the results are received at all processes which performed the computing operation. In this case, it is contemplated that a distributed computing operation, such as the exemplary algorithm demonstrated in FIG. 3, is performed prior to gathering results. This is because the exemplary operations demonstrated by FIG. 7 are configured to gather the results of a distributed computing operation which has already been performed. In an embodiment of the present invention, the received directive specifies that operations implementing the MPI_ALLREDUCE primitive defined by the Message Passing Interface shall be performed.

Before performing the exemplary operations shown here, a number may be assigned to each of the plurality of processes from which results are gathered. Assigning unique numbers to each process beneficially assists an exemplary pairing algorithm demonstrated below. It is noted that the numbers are assigned in a manner identical to the case where results are received at a single process. Specifically, no two processes are assigned the same number. The numbers may be consecutive integers beginning with zero. It is contemplated that the unique numbers are unchanged over at least the course of a single global reduce operation. If results are gathered subsequently to a distributed computing operation, it is contemplated that the same numbers are used as in the algorithm applied to pair the processes during the distributed computing algorithm. Furthermore, if processes participating in a distributed computing algorithm are reused to gather results, the number previously assigned to each process may still be available to operations for gathering the results. In this case, assigning numbers to each process prior to gathering results may be omitted, as the previously assigned numbers may be reused.

At pairing operation 702, each process may select a process with which to interact. A process may also select no interaction partner. Unlike the case where results are received at a single process, the pairing is symmetrical. Specifically, if a first process is paired with the second process, the second process is also paired with the first process. It is emphasized that as a result of each of the plurality of processes performing the pairing operation, each process has a maximum of one interaction partner.

In an embodiment of the present invention, a value equal to two to the power of a factor is calculated. If the number of the process is an exact multiple of double the calculated value, it selects an interaction partner having the number equal to the number of the process plus the calculated value. In mathematical terms, if the number of the process is represented by i and the factor is represented by k, the process may determine the remainder resulting from dividing i by $2^{k+1}$. If and only if the remainder is zero, the process selects an interaction partner having the number $i+2^k$.

If the process is selected by a second process as an interaction partner according to the preceding formula, the process likewise selects the second process as its interaction partner. This may be achieved by receiving a request from the selecting process. It may also be achieved by applying a mathematical inverse of the formula for selecting an interaction partner to determine whether another process would have selected the process. It is noted that a process which selects a second process according to the preceding formula will never be selected by a third process according to the same formula.

If neither of the preceding two steps pairs the process with an interaction partner, the process selects no interaction partner for the current iteration.

At determining operation 704, the process determines whether an interaction partner was selected. If no interaction partner was selected, control passes to determining operation 612. If an interaction partner was selected, processing continues with transmitting operation 606.

At transmitting operation 706, the process transmits a result of one or more computing operations to the interaction partner of the process. The result may comprise all results of computing operations currently located at the process.

At receiving operation 708, the process receives a result of one or more computing operations from its interaction partner. Receiving operation 708 may be performed concurrently with transmitting operation 706.

At determining operation 710, each process determines whether the results are completely gathered. If so, processing may stop. If not, control returns to pairing operation 702. Each individual process may wait until all processes have reached determining operation 710 before returning to pairing operation 702.

After $\log_2 N$ iterations of the exemplary gathering algorithm, where N is the number of processes engaged in the global reduce operation, the combined result is completely received at each of the plurality of processes. Accordingly, determining operation 710 may comprise determining whether $\log_2 N$ iterations have been completed. For example, if 16 processes are engaged in the global reduce operation, determining operation 710 may determine whether $\log_2 16=4$ iterations have been completed.

If control returns to pairing operation 702, significant differences exist between the first iteration and subsequent iterations. Notably, pairing operation 702 either associates the process with a subsequent interaction partner with which the process has not previously been paired or associates the process with no interaction partner. In an embodiment of the present invention, the number of the interaction partner is calculated using a calculating operation as previously discussed, but wherein the factor contains a value not used in a preceding pairing operation. Specifically, the factor may contain the value of the factor used in the preceding iteration of pairing operation 702 incremented by one.

Transmitting operation 706 in subsequent iterations may forward results received during previous iterations to the interaction partner selected for the current iteration. Specifically, the result of one or more computing operations transmitted by transmitting operation 706 may comprise results of computing operations received at the process during previous iterations. It follows that receiving operation 708 may likewise comprise receiving results of computing operations received at the process during previous iterations.

It is emphasized that at the conclusion of the exemplary gathering stage, the combined result of the distributed computing operation may be received at each of the plurality of processes.

Figure 8A:
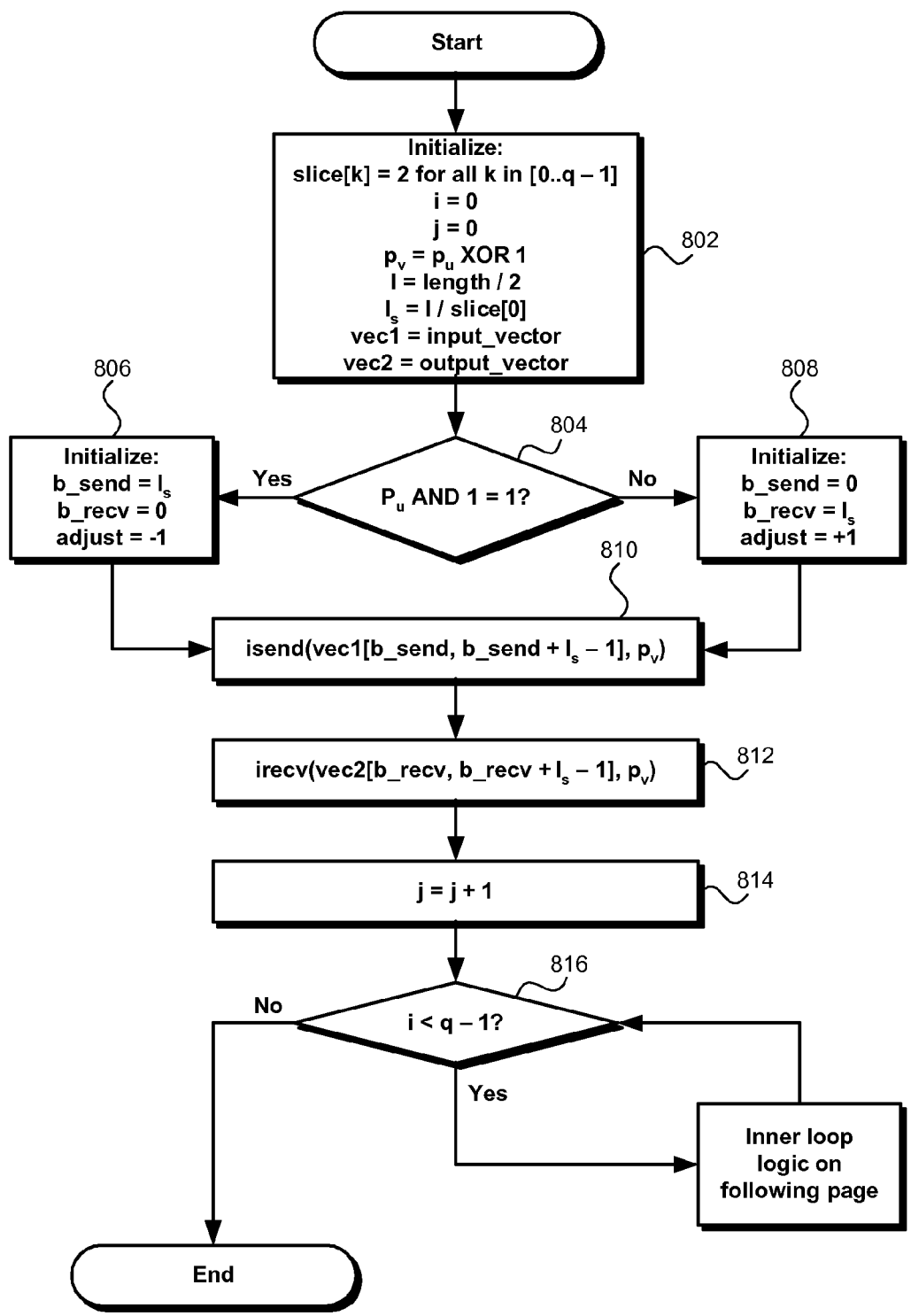
FIGS. 8A and 8B demonstrates a flowchart of exemplary operations performed by an individual process to assist in distributing and reducing a vector across multiple processes.
Figure 8B:
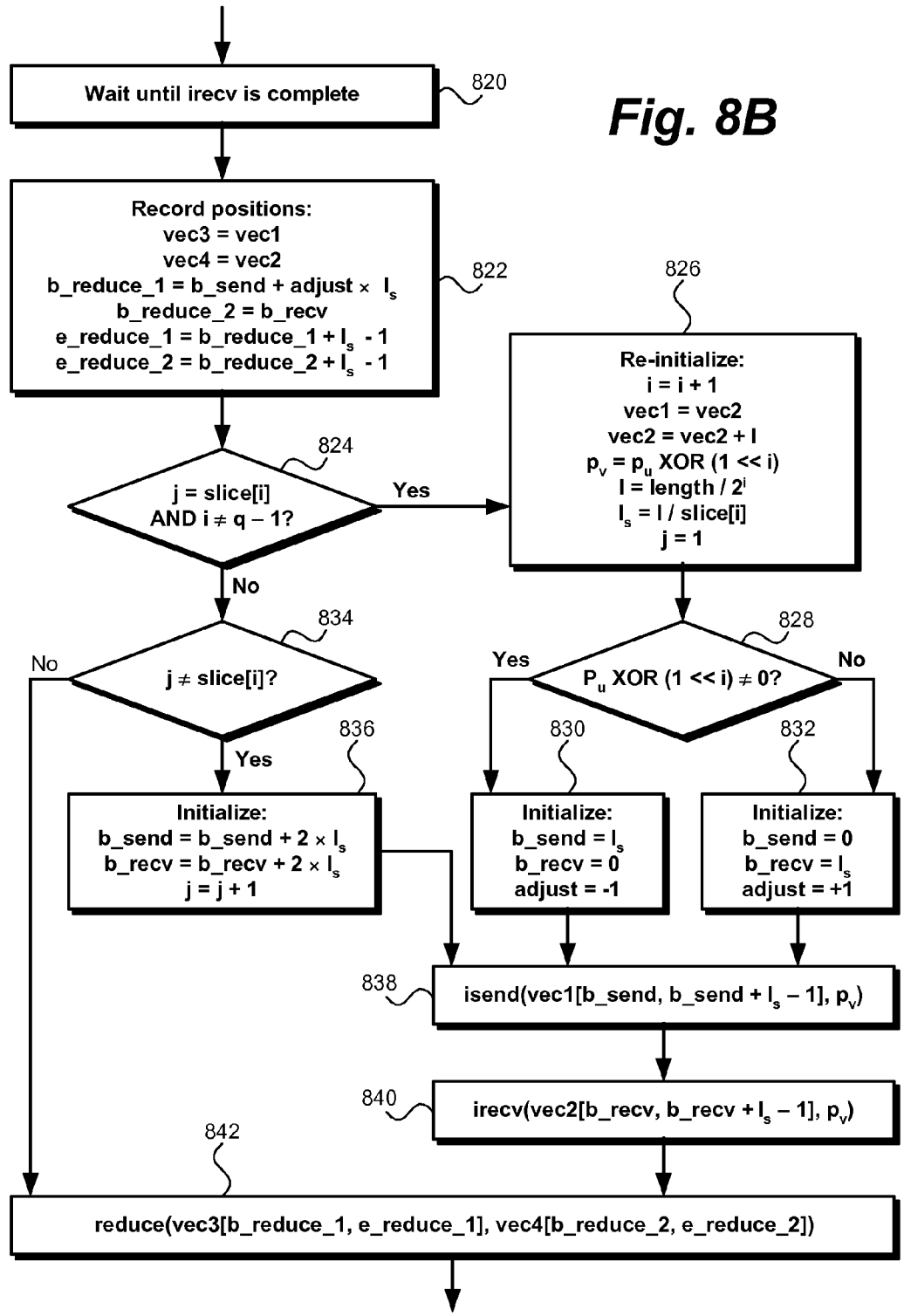

FIGS. 8A and 8B illustrate a flowchart of exemplary operations performed by an individual process to assist in distributing and reducing a vector across multiple processes. It is emphasized that each processor independently performs the operations shown in the flowchart.

The following symbols and notation are used throughout FIGS. 8A and 8B:

n is the number of processes participating in the distribution and reduction of the vector. In the exemplary operations of FIGS. 8A and 8B, it is assumed that n can be expressed as an integral power of two. Specifically, n can be expressed as $2^q$, wherein q represents the number of iterations required to complete the distributing operation. The processes are consecutively numbered from zero to n−1. However, those skilled in the art will appreciate that the algorithm can be readily modified to accommodate a number of processors which is not an integral power of two.

$p_u$ is the number of the process performing the operations shown in FIGS. 8A and 8B. In other words, $p_u$ is the number of the process whose perspective is considered in reading the algorithm.

$p_v$ is the number of the interaction partner of the process numbered $p_u$.

input_vector denotes the input vector.

output_vector denotes the output vector.

length denotes the length of the vector to be reduced. It is contemplated that the length of input_vector and output_vector are the same.

At initializing operation 802 in FIG. 8A, the process initializes itself to prepare to distribute and reduce the vector. Initialization may comprise setting variables to initial values. Specifically:

slice[i] contains the number of slices into which a subvector to be exchanged is segmented during iteration. In the exemplary operations of FIGS. 8A and 8B, slice[i] is initialized to two for every integral value of i between zero and q−1 inclusive. However, it is noted that different values of slice[i] may be selected to optimize performance for a specific configuration. A number of slices other than two may be selected in order to optimize the depth of the pipeline. Furthermore, a different number of slices may be selected for each iteration.

i, a counter indexing the current subvector, is initialized to zero.

j, a counter indexing the current slice of the current subvector, is initialized to zero.

$p_v$, the rank of the new interaction partner, is set to the bitwise exclusive or of $p_u$ and 1.

l, which contains the size of a subvector, is initialized to length divided by two.

$l_s$, which contains the size of a slice of a subvector, is initialized to l divided by slice[0].

vec1, a buffer comprising the vector to be transmitted, is initialized to input_vector.

vec2, a buffer comprising the vector being received, is initialized to output_vector.

At determining operation 804, a bitwise and operation is performed between the rank of the process, $p_u$, and one. If the result is one, control proceeds to initializing operation 806. If the result is zero, control proceeds to initializing operation 808.

If initializing operation 806 was selected, the following variables are set:

b_send, a counter variable denoting the next position to be sent within the subvector to be sent, is initialized to $l_s$.

b_recv, a counter variable denoting the next position to be received within the subvector being received, is initialized to zero.

adjust is initialized to negative one.

If instead initializing operation 808 was selected, the following variables are set:

b_send is initialized to zero.

b_recv is initialized to $l_s$.

adjust is initialized to positive one.

At transmitting operation 810, the process transmits the first slice to its interaction partner. Specifically, a slice of vec1 beginning at position b_send and ending at position b_send+ $l_s$−1 is transmitted to the interaction partner. It is contemplated that transmitting operation 810 is non-blocking. Specifically, transmitting operation 810 may occur wholly or partially in parallel with the following operations. This may be facilitated by Remote Direct Memory Access (RDMA), which may effect the data transfer while the process itself continues to the following operations.

At receiving operation 812, the process receives the first slice from its interaction partner. Specifically, a slice of vec2 beginning at position b_recv and ending at position b_recv+ $l_s$−1 is received from the interaction partner. As with transmitting operation 810, it is contemplated that receiving operation 812 is non-blocking. Specifically, receiving operation 812 may occur wholly or partially in parallel with the following operations. This may be facilitated by Remote Direct Memory Access (RDMA), which may effect the data transfer while the process itself continues to the following operations. For this reason, it is contemplated that receiving operation 812 occurs concurrently with transmitting operation 810.

It is noted that the first pair of slices exchanged precedes the main loop. This is because the processing occurring within the loop involves exchanging a pair of slices concurrently with reducing a received pair of slices. This in turn necessitates that a pair of slices has already been received as of the initial loop iteration.

At incrementing operation 814, the counter variable j is incremented by one. This reflects the fact that the second slice is the next to be transmitted.

At determining operation 816, i is compared to q−1. If i is less than q−1, control passes to operation 820 in FIG. 2B. If i is greater than or equal to q−1, processing stops, as this condition should only occur if the distributing and reduction of the vectors is complete. It is noted that determining operation 816 is conceptually similar to the "while" loop construct of many programming languages known in the art.

At waiting operation 820 in FIG. 8B, the process waits until receiving operation 812 is complete.

At recording operation 822, the process records positions within the vectors in order to facilitate reducing operation 842. Recording may comprise setting specific variables equal to specific values, as follows:

vec3, a buffer comprising a vector to be reduced, is set to vec1.

vec4, another buffer comprising a vector to be reduced, is set to vec2.

b_reduce__1, the position within vec3 at which to begin the reducing operation, is set to b_send plus the product of adjust and $l_s$. It is noted that adjust equals either positive one or negative one. In the former case, b_reduce__1 equals b_send plus $l_s$. In the latter case, b_reduce__1 equals b_send minus $l_s$.

b_reduce__2, the position within vec4 at which to begin the reducing operation, is set to b_recv.

e_reduce__1, the position within vec3 at which to end the reducing operation, is set to b_reduce__1 plus $l_s$ minus one.

e_reduce__2, the position within vec4 at which to end the reducing operation, is initialized to b_reduce__2 plus $l_s$ minus one.

At determining operation 824, j is compared to slice[i], and i is compared to q−1. If j is equal to slice[i], and i is not equal to q−1, control passes to re-initializing operation 826. If either or both conditions is untrue, control passes to determining operation 834. It is noted that when j is equal to slice[i] but i is equal to q−1, no more slices remain to be transmitted but the segment just transmitted remains to be reduced. In this case, transmission of the next slice is omitted via determining operation 824, which is advantageous because no next slice exists. However, the reducing is not omitted because the slices just transmitted still must be reduced. The loop will then exit at determining operation 816.

At reinitializing operation 826, the process performs initializing operations to select another interaction partner and to prepare to exchange information with that process. In particular, variables previously discussed may be initialized to values appropriate to interacting with the new process. The variables and their initial values may include:

i, the subvector index, is incremented by one.

vec1 is set to vec2. This causes the intermediate result vector to be used as the next input vector.

vec2 is incremented by 1. This causes the next available space in the output vector to be used.

$p_v$, the rank of the new interaction partner, is set to the exclusive or of $p_u$ and 1 left-shifted by i bits.

l, the size of a subvector, is set to length divided by 2 to the power of i+1. It is noted that this causes the amount of the data exchanged to be half of that exchanged during the previous iteration.

$l_s$, the size of a slice of a subvector, is set to l divided by slice[i]. Thus, the size of a slice is set to the new value of l divided by the number of slices to be used for this iteration.

j, the slice index, is set to 1.

At determining operation 828, a bitwise and operation is performed between the rank of the process, $p_u$, and 1 left-shifted by i bits. If the result is non-zero, control proceeds to initializing operation 830. If the result is zero, control proceeds to initializing operation 832. It is noted that determining operation 828 is analogous to determining operation 804.

If initializing operation 830 was selected, the following variables are set:

b_send, which denotes the next position to be sent within the subvector to be sent, is initialized to $l_s$.

b_recv, which denotes the next position to be received within the subvector being received, is initialized to zero.

adjust is initialized to negative one.

It is noted that re-initializing operation 830 is identical to initializing operation 806.

If instead initializing operation 832 was selected, the following variables are set:

b_send is initialized to zero.

b_recv is initialized to $l_s$.

adjust is initialized to positive one.

It is noted that re-initializing operation 832 is identical to initializing operation 808. It is further noted that by following this algorithm, the process may switch roles from iteration to iteration.

After either re-initializing operation 830 or re-initializing operation 832, control then passes to sending operation 838.

At determining operation 834, j is compared to slice[i]. If j is not equal to slice[i], control passes to initializing operation 836. Otherwise, control passes to reducing operation 842.

At initializing operation 836, the following variables are set:

b_send is incremented by double the value of $l_s$.

b_recv is likewise incremented by double the value of $l_s$.

j, the slice index, is incremented by one.

At transmitting operation 838 (which may follow initializing operation 836, re-initializing operation 830 or re-initializing operation 832), the process transmits the first slice to its interaction partner. Specifically, a slice of vec1 beginning at position b_send and ending at position b_send+$l_s$−1 is transmitted to the interaction partner. It is contemplated that transmitting operation 838 is non-blocking. Specifically, transmitting operation 838 may occur wholly or partially in parallel with the following operations. This may be facilitated by Remote Direct Memory Access (RDMA), which may effect the data transfer while the process itself continues to the following operations. It is noted that transmitting operation 838 is identical to transmitting operation 810.

At receiving operation 840, the process receives the first slice from its interaction partner. Specifically, a slice of vec2 beginning at position b_recv and ending at position b_recv+$l_s$−1 is received from the interaction partner. As with transmitting operation 838, it is contemplated that receiving operation 840 is non-blocking. Specifically, receiving operation 840 may occur wholly or partially in parallel with the following operations. This may be facilitated by Remote Direct Memory Access (RDMA), which may effect the data transfer while the process itself continues to the following operations. For this reason, it is contemplated that receiving operation 840 occurs concurrently with transmitting operation 838. It is noted that receiving operation 840 is identical to receiving operation 812.

At reducing operation 842, the reduction operation is performed on the previous slice. The reduction operation accepts as input vec3 from position b_reduce_1 to e_reduce_1 and vec4 from position b_reduce_2 to e_reduce_2. It is emphasized that the reduction operation may comprise any of a wide variety of computing operations known in the art. Control then returns to determining operation 816 on FIG. 8A.

Figure 9:
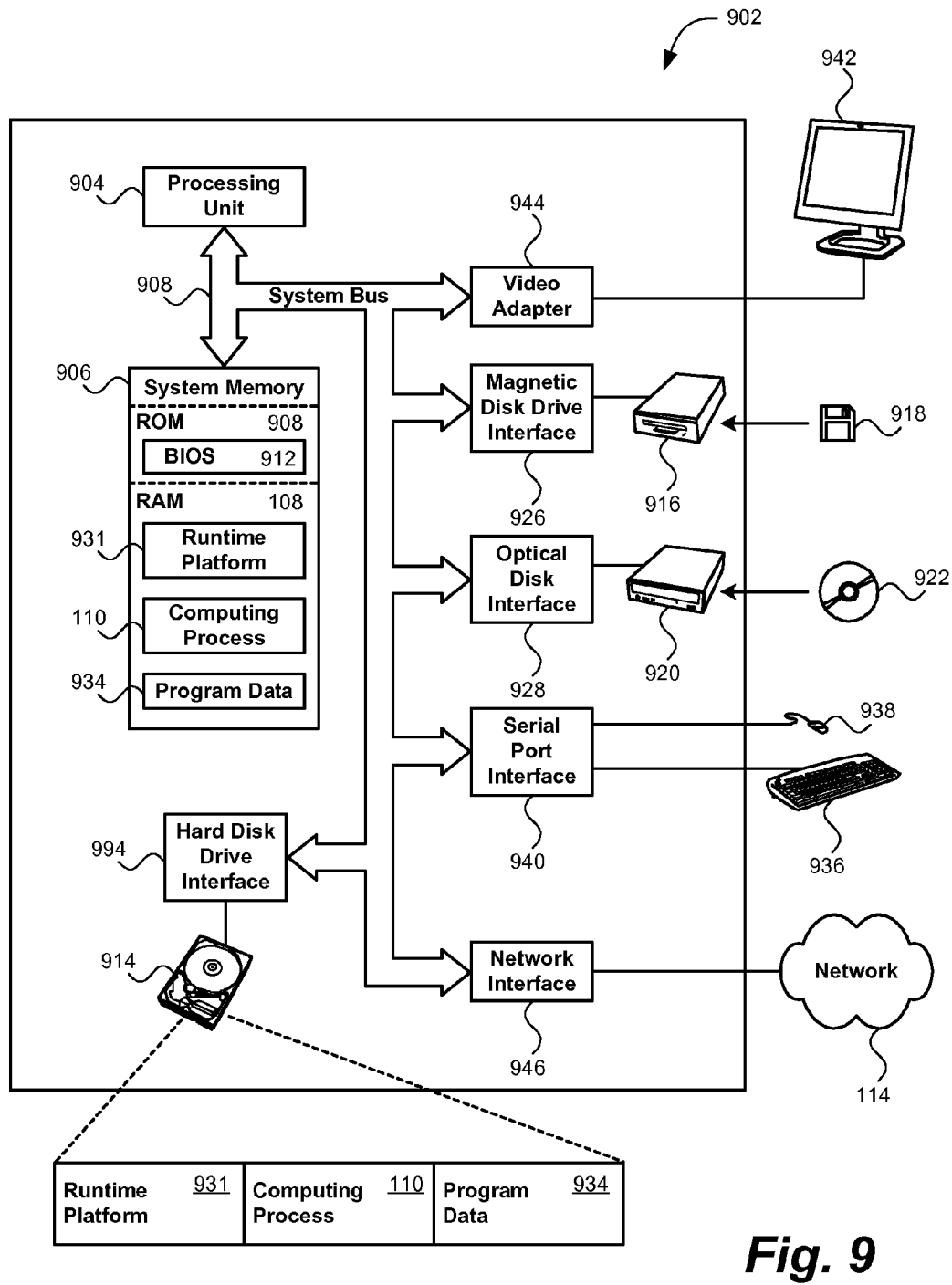
FIG. 9 shows an illustrative embodiment of a computer system as contemplated by the present invention.

With reference to FIG. 9, an illustrative embodiment of a computer system 902 contemplated by the present invention is shown. The computer system 902 includes a processing unit 904, a system memory 906, and a system bus 908 that couples the system memory 906 to the processing unit 904. The system memory 906 includes read only memory (ROM) 908 and random access memory (RAM) 910. A basic input/output system (BIOS) 912, containing the basic routines that help to transfer information between elements within the computer system 902, such as during start-up, is stored in ROM 908.

The computer system 902 further includes a hard disk drive 914, a magnetic disk drive 916 (to read from and write to a removable magnetic disk 918), and an optical disk drive 920 (for reading a CD-ROM disk 922 or to read from and write to other optical media). The hard disk drive 914, magnetic disk drive 916, and optical disk drive 920 are connected to the system bus 908 by a hard disk interface 924, a magnetic disk interface 926, and an optical disk interface 928, respectively. The drives and their associated computer-readable media provide nonvolatile storage for the computer system 902. Although computer-readable media refers to a hard disk, removable magnetic media and removable optical media, it should be appreciated by those skilled in the art that other types of media that are readable by a computer, such as flash memory cards, may also be used in the illustrative computer system 902.

A number of program modules may be stored in the drives and RAM 108, including a runtime platform 931, a computing process 110, program data 934, and other program modules (not shown). As discussed above, the computing process 110 may perform a wide variety of goals. Such goals may include, without limitation, scientific and technical research, predicting future weather conditions and simulating scientific phenomena. The computing operation may be performed as part of a high performance computing task.

A user may enter commands and information into the computer system 902 through a keyboard 936 and pointing device, such as a mouse 938. Other input devices (not shown) may include a microphone, modem, joystick, game pad, satellite dish, scanner, or the like. These and other input devices are often connected to the processing unit through a serial port interface 940 that is coupled to the system bus 908.

A monitor 942 or other type of display device is also connected to the system bus 908 via an interface, such as a video adapter 944. In addition to the monitor, the computer system 902 may include other peripheral output devices (not shown), such as speakers and printers.

The computer system 902 operates in a networked environment using logical connections to one or more remote devices. The remote device may be a server, a router, a peer device or other common network node. When used in a networking environment, the computer system 902 is typically connected to the network 114 through a network interface 946. In a network environment, program modules depicted relative to the computer system 902, or portions thereof, may be stored in one or more remote memory storage devices.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A computer program product embodied in non-transitory computer readable medium for gathering results of a computing operation distributed among a plurality of processes, the computer program product comprising:
    program code for pairing the plurality of processes such that each process has at least one interaction partner;
    program code for transmitting a result of one or more computing operations from a process to the interaction partner of the process;
    program code for iterating over the pairing and transmitting operations, wherein pairing operations subsequent to the first pairing operation associate a process with an interaction partner with which the process has not previously been paired;
    wherein the result of one or more computing operations comprises results of computing operations received at the process during previous iterations;
    program code for assigning a number to each of the plurality of processes, wherein no two processes are assigned the same number;
    program code for calculating two to the power of a factor and performing the pairing operation such that a process having a number which is a multiple of double the calculated value is associated with an interaction partner having a number equal to the number of the process plus the calculated value; and
    program code for repeating the calculating operation for each pairing operation subsequent to the first pairing operation, wherein the factor contains a value not used in a preceding pairing operation.

2. The computer program of claim 1, further comprising program code for receiving a directive to perform a global reduce operation configured to distribute a computing operation among a plurality of processes and to gather results of the computing operation such that the results are received at all processes which performed the computing operation.

3. The computer program of claim 1, further comprising program code for assigning a number to each of the plurality of processes, wherein no two processes are assigned the same number.

4. The computer program product of claim 1, further comprising
    program code for receiving a directive to perform a global reduce operation configured to distribute a computing operation among a plurality of processes and to gather results of the computing operation such that the results are received at a single process.

5. The computer program product of claim 1, wherein the computing operation is configured to simulate an observable event.

6. The computer program product of claim 1, further comprising program code for selecting a subset of data located at the process.

7. The computer program product of claim 6, wherein the subset of the data includes half of the data.

8. The computer program product of claim 1, wherein the iterating program code causes a next pairing operation subsequent to a first pairing operation to associate the process with a subsequent interaction partner with which the process has not previously been paired.

9. The computer program of claim 3, further comprising program code for calculating an exclusive OR of the number of each process and a mask.

10. The computer program of claim 1, further comprising program code for performing at least one computing operation of the plurality of processes using at least one computer processor on a first data segment previously received from a previous process partner and a second data segment from the plurality of data segments.

11. A computer program product embodied in non-transitory computer readable medium for gathering results of a computing operation distributed among a plurality of processes, the computer program product comprising:
    program code for pairing the plurality of processes such that each process has at least one interaction partner;
    program code for transmitting a result of one or more computing operations from a process to the interaction partner of the process;
    program code for iterating over the pairing and transmitting operations, wherein pairing operations subsequent to the first pairing operation associate a process with an interaction partner with which the process has not previously been paired;
    wherein the result of one or more computing operations comprises results of computing operations received at the process during previous iterations
    program code for assigning a number to each of the plurality of processes, wherein no two processes are assigned the same number;
    program code for calculating the exclusive or of the number of a process and a mask and performing the first pairing operation such that a process is associated with an interaction partner having a number equal to the result of the calculating operation;
    program code for repeatedly performing the exclusive or calculation for each pairing operation subsequent to the first pairing operation, wherein the mask contains a value not used in a preceding pairing operation;
    wherein the iterating program code causes a next pairing operation subsequent to a first pairing operation to associate the process with a subsequent interaction partner with which the process has not previously been paired; and
    wherein the result of one or more computing operations comprises results of computing operations received at the process during previous iterations.

* * * * *